(12) United States Patent
Sakhnini et al.

(10) Patent No.: US 11,564,231 B2
(45) Date of Patent: Jan. 24, 2023

(54) NARROW BANDWIDTH PART TRANSITIONS FOR REDUCED CAPABILITY DEVICES

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/149,542

(22) Filed: Jan. 14, 2021

(65) Prior Publication Data

US 2021/0258963 A1    Aug. 19, 2021

Related U.S. Application Data

(60) Provisional application No. 62/976,115, filed on Feb. 13, 2020.

(51) Int. Cl.
*H04W 72/04* (2009.01)
*H04B 1/713* (2011.01)
(Continued)

(52) U.S. Cl.
CPC ........ *H04W 72/0493* (2013.01); *H04B 1/713* (2013.01); *H04W 4/80* (2018.02);
(Continued)

(58) Field of Classification Search
CPC ... H04W 72/0493; H04W 4/80; H04W 24/08; H04W 56/001; H04W 72/042;
(Continued)

(56) References Cited

U.S. PATENT DOCUMENTS

2017/0311355 A1* 10/2017 Yi ..................... H04W 74/0833
2019/0090293 A1*  3/2019 Su .......................... H04W 76/14
(Continued)

FOREIGN PATENT DOCUMENTS

| CN | 110167107 A | 8/2019 |
|---|---|---|
| WO | WO-2016048044 A1 | 3/2016 |
| WO | WO-2019154270 A1 * | 8/2019 |

OTHER PUBLICATIONS

International Search Report and Written Opinion—PCT/US2021/013631—ISA/EPO—dated Apr. 29, 2021.

*Primary Examiner* — Shailendra Kumar
(74) *Attorney, Agent, or Firm* — Holland & Hart LLP

(57) ABSTRACT

Methods, systems, and devices for wireless communications are described. Wireless communications systems may support implementation of narrow bandwidth parts (NBWPs). For example, a NBWP may be established over a reduced bandwidth to support user equipment (UEs) with reduced complexity features (e.g., such as UEs with reduced bandwidth capabilities). Wireless communications systems may provide for UE transitioning to a NBWP (e.g., after initial cell search), as well as for UE transitioning amongst NBWPs (e.g., subsequent transitions to other NBWPs after an initial transition to a NBWP after initial cell search). For example, a UE may initially transition to a NBWP (e.g., transition to monitor the NBWP for reference signals or to utilize the NBWP for uplink/downlink communications) to support reduced bandwidth capabilities of the UE. Subsequently, the UE may transition amongst other NBWPs for network load balancing, UE frequency hopping gain, etc.

45 Claims, 17 Drawing Sheets

(51) Int. Cl.
| | |
|---|---|
| *H04W 4/80* | (2018.01) |
| *H04W 24/08* | (2009.01) |
| *H04W 56/00* | (2009.01) |
| *H04W 76/11* | (2018.01) |
| *H04W 76/27* | (2018.01) |

(52) U.S. Cl.
CPC ......... *H04W 24/08* (2013.01); *H04W 56/001* (2013.01); *H04W 72/042* (2013.01); *H04W 72/0453* (2013.01); *H04W 76/11* (2018.02); *H04W 76/27* (2018.02)

(58) Field of Classification Search
CPC . H04W 72/0453; H04W 76/11; H04W 76/27; H04W 48/20; H04B 1/713; H04J 11/0069; H04J 11/0079; H04L 5/0048; H04L 5/0094; H04L 5/003
See application file for complete search history.

(56) References Cited

U.S. PATENT DOCUMENTS

| | | | |
|---|---|---|---|
| 2019/0124558 A1* | 4/2019 | Ang | H04L 5/001 |
| 2019/0274162 A1* | 9/2019 | Zhang | H04W 74/08 |
| 2019/0394776 A1* | 12/2019 | Lee | H04W 16/14 |
| 2022/0039158 A1* | 2/2022 | Awadin | H04W 74/0816 |

* cited by examiner

NARROW BANDWIDTH PART TRANSITIONS FOR REDUCED CAPABILITY DEVICES

CROSS REFERENCE

The present application for patent claims the benefit of U.S. Provisional Patent Application No. 62/976,115 by SAKHNINI et al., entitled "NARROW BANDWIDTH PART TRANSITIONS FOR REDUCED CAPABILITY DEVICES," filed Feb. 13, 2020, assigned to the assignee hereof, and expressly incorporated by reference herein.

BACKGROUND

The following relates generally to wireless communications, and more specifically to narrow bandwidth part (NBWP) transitions for reduced capability devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, connections may be established using a relatively wide channel frequency bandwidth. In some cases, one or more portions of the channel frequency bandwidth (e.g., which may be referred to as bandwidth parts (BWPs)) may be used for communications with a UE. For example, a carrier may be associated with a particular bandwidth of the radio frequency spectrum, and the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions of the carrier bandwidth or over BWPs, or for operating over all of the carrier bandwidth. In some cases, monitoring and utilization of BWPs may be a computation burden for some devices (e.g., such as devices with reduced capability).

SUMMARY

The described techniques relate to improved methods, systems, devices, and apparatuses that support narrow bandwidth part (NBWP) transitions for reduced capability devices. Generally, the described techniques provide for implementation of NBWPs (e.g., for reduced capability devices, such as reduced capability user equipment (UEs), New Radio (NR)-light UEs, or low tier UEs). For example, a NBWP may share similar parameters with a BWP (e.g., such as an NR BWP) and may be established over a reduced bandwidth to support UEs with reduced complexity features (e.g., such as UEs with reduced bandwidth capabilities). The techniques described herein may provide for a UE transitioning to a NBWP (e.g., after initial cell search), as well as for a UE transitioning amongst NBWPs (e.g., subsequent transitions to other NBWPs after an initial transition to a NBWP after initial cell search). For example, a UE may initially transition to a NBWP (e.g., transition to monitor the NBWP for reference signals or to utilize the NBWP for uplink/downlink communications) to support reduced bandwidth capabilities of the UE. Subsequently, the UE may transition amongst other NBWPs for network load balancing, UE frequency hopping gain, etc. (e.g., as well as to continue to leverage reduced UE bandwidth).

According to some aspects, a UE may perform an initial transition to a NBWP after cell acquisition. Generally, wireless communications system may support initial UE transition to a NBWP after the initial cell search, after beam selection, after reading a system information block (SIB), after a random access channel (RACH) procedure, etc. Further, the initial transition of a UE to a NBWP may be configured by the network or may be UE initiated. For example, in some cases, the network may signal an indication of an initial NBWP (e.g., such as a target NBWP index or a NBWP frequency location and bandwidth) per UE, or per group of UEs, via radio resource control (RRC) signaling, downlink control information (DCI), or a medium access control (MAC) control element (MAC CE). A UE may thus transition to a NBWP indicated by the network after the initial cell search (e.g., after beam selection, after reading a SIB, after a RACH procedure, etc., depending on implementation). In other examples, a UE may select a NBWP for initial transition to the NBWP based on a hashing function (e.g., between a NBWP index and an international mobile subscriber identity (IMSI) of the UE, a radio network temporary identifier (RNTI) of the UE, or both), or the UE may randomly select an available NBWP based on a probability distribution (e.g., that may be preconfigured by the network or otherwise indicated by the network).

According to other aspects, a UE may (e.g., after initial transition to a NBWP) subsequently transition amongst other NBWPs. Such subsequent transitions between NBWPs may be configured semi-persistently, periodically, aperiodically, randomly, or some combination thereof (e.g., wireless communications systems may support, as an example, periodic UE transitions between NBWPs for frequency hopping gains in addition to aperiodic UE transitions to an indicated NBWP based on load balancing configurations by the network). In some examples (e.g., for semi-persistent NBWP transition configurations and aperiodic NBWP transition configurations), the network may indicate a new (e.g., a next or subsequent) target NBWP for UE transitioning. In other examples (e.g., for random NBWP transition configurations and periodic NBWP transition configurations), UEs may transition amongst NBWPs based on a NBWP transitioning pattern (e.g., which may be preconfigured by the network), based on random selection (e.g., based on some preconfigured or network indicated probability distribution), etc.

DETAILED DESCRIPTION

Figure 1:
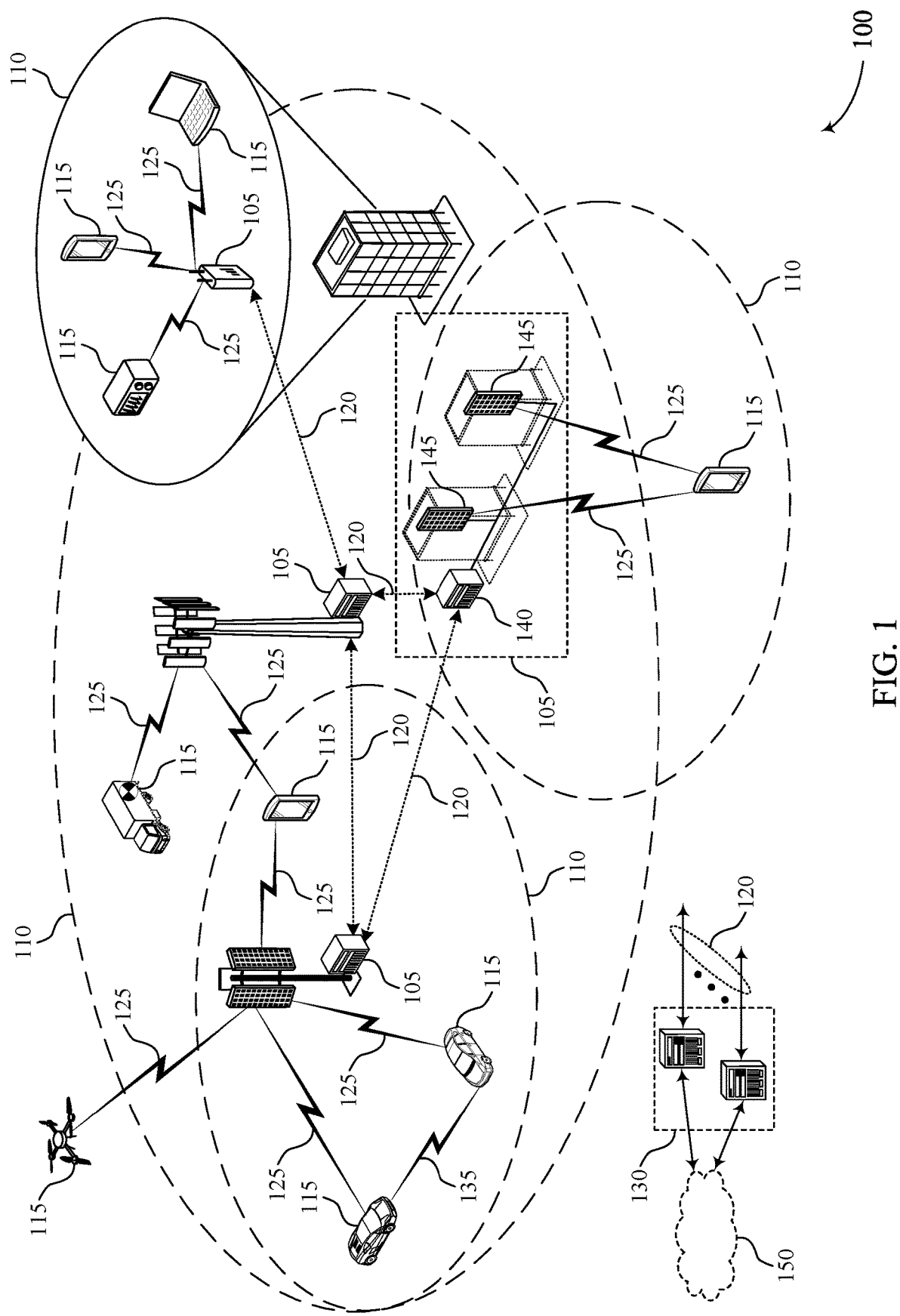
FIG. 1 illustrates an example of a system for wireless communications that supports narrow bandwidth part (NBWP) transitions for reduced capability devices in accordance with aspects of the present disclosure.

Wireless communications systems may support communication links between wireless devices (e.g., such as a base station and a user equipment (UE)), such that wireless devices may communicate in radio frequency spectrum bands. For example, a base station and a UE may operate over a carrier bandwidth. In some cases, wireless communications systems (e.g., a base station) may divide the carrier bandwidth into multiple (e.g., up to two or four) bandwidth parts (BWPs) that may be used for communications with a UE. Each BWP may include a contiguous set of resource blocks on a carrier bandwidth, and different BWPs may or may not be contiguous in frequency (e.g., a BWP may be adjacent in frequency to another BWP, or a BWP may have gaps or guardbands to adjacent BWPs). In some cases, BWPs may be configured with different properties (e.g., protocol features, numerologies, modulation schemes, or physical channels). Further, in some cases, BWPs may be defined for some carriers (e.g., a New Radio (NR) carrier may define up to four NR BWPs, and each NR BWP may have some defined bandwidth or set of properties/parameters). In some aspects, a BWP may be configured for one or more radio access technologies.

Further, some wireless communications systems may support reduced capability UEs. A reduced capability UE (e.g., a low tier UE or a NR-light UE) may operate with one or more of a reduced transmit power, a reduced number of transmit and/or receive antennas, a reduced transmit/receive bandwidth, or reduced computational complexity. For example, a reduced capability UE may be a smart wearable device, an industrial sensor, a video surveillance device, etc. The techniques described herein may provide for implementation of narrow BWPs (NBWPs) to reduce BWP bandwidth and support complexity (e.g., bandwidth) reduction features for reduced capability UEs. According to the described techniques, reduced capability UEs may thus reduce power consumption and conserve computational resources by reducing operating bandwidth (e.g., of monitoring BWPs such as, for example NR BWPs). For instance, reduced capability UEs may be able to transition to a NBWP (e.g., switch to a narrow BW) based on reduced amounts of data to be transferred, less frequent data transfers, etc., and thus may reduce bandwidth and power consumption during communications with a base station.

For example, a NBWP may share similar parameters with a BWP (e.g., such as an NR BWP) and may be established over a reduced bandwidth to support UEs with reduced complexity features (e.g., such as UEs with reduced bandwidth capabilities). The techniques described herein may provide for a UE transitioning to a NBWP (e.g., after initial cell search), as well as for a UE transitioning amongst NBWPs (e.g., subsequent transitions to other NBWPs after an initial transition to a NBWP after initial cell search). For instance, a UE may initially transition to a NBWP (e.g., transition to monitor the NBWP for reference signals or to utilize the NBWP for uplink/downlink communications) to support reduced bandwidth capabilities of the UE. Subsequently, the UE may transition amongst other NBWPs for network load balancing, UE frequency hopping gain, etc. (e.g., as well as to continue to leverage reduced UE bandwidth).

Aspects of the disclosure are initially described in the context of a wireless communications system. An example NBWP transition diagram, an example process flow, and an example architecture are then described. Aspects of the disclosure are further illustrated by and described with reference to apparatus diagrams, system diagrams, and flowcharts that relate to NBWP transitions for reduced capability devices.

FIG. 1 illustrates an example of a wireless communications system 100 that supports NBWP transitions for reduced capability devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. According to the techniques described herein, a carrier (e.g., a carrier bandwidth) may further be divided into one or more NBWPs. In some examples, a UE 115 (e.g., a reduced capability UE 115) may be configured with one NBWP active for the UE 115 at a given time. Further, a UE 115 (e.g., a reduced capability UE 115) may transition to a NBWP (e.g., to an initial NBWP) and amongst NBWPs (e.g., to subsequent NBWPs) as discussed herein.

The time intervals for the base stations 105 or the UEs 115 may be expressed in multiples of a basic time unit which may, for example, refer to a sampling period of $T\_s = 1/((\Delta f\_max \cdot N\_f))$ seconds, where $\Delta f\_max$ may represent the maximum supported subcarrier spacing, and $N\_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N\_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 may transmit one or more synchronization signal blocks (SSBs) to a UE 115, and the UE 115 may process (e.g., decode) the SSBs in order to obtain system information and begin communications with the base station. An SSB (e.g., a synchronization block) may include synchronization signals such as a primary synchronization signal (PSS), a physical broadcast channel (PBCH), and a secondary synchronization signal (SSS), which may be referred to as acquisition signals and may be transmitted from the base station 105 to the UE 115. The PSS, PBCH, and SSS may each occupy different sets of symbols (e.g., OFDM symbols) and subcarriers of the SSB. A UE 115 may utilize SSBs to acquire downlink synchronization information and system information (e.g., to establish a communication channel with the base station 105). In some cases, some wireless communications system 100 may further utilize SSBs with beam sweeping for beam management purposes.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support reduced capability UEs 115, which may also be referred to as low tier UEs 115, NR-Light UEs 115, etc. A reduced capability UE may operate with one or more of a reduced transmit power, a reduced number of transmit and/or receive antennas, a reduced transmit/receive bandwidth, or reduced computational complexity. For example, a reduced capability UE 115 may be a smart wearable device (e.g., a heartbeat monitor), an industrial sensor (e.g., a pressure sensor), a video surveillance device, etc. In some cases, reduced capability UEs 115 may be associated with a reduced number of UE receive/transmit antennas, UE bandwidth reduction, half-duplex-FDD, relaxed UE processing time, relaxed UE processing capability, etc. As such, wireless communications system 100 may support UE power saving and battery lifetime enhancement for reduce capability UEs 115 in applicable use cases (e.g., in delay tolerant use cases). For example, wireless communications system 100 may support techniques such as reduced physical downlink control channel (PDCCH) monitoring by smaller numbers of blink decodes and control channel element (CCE) limits, extended discontinuous reception (DRX) for radio resource control (RRC) Inactive and/or Idle, radio resource management (RRM) relaxation for stationary devices, etc.

Wireless communications system 100 may implement (e.g., support and configure) NBWPs to reduce BWP bandwidth and support complexity (e.g., bandwidth) reduction features for reduced capability UEs 115. According to the described techniques, reduced capability UEs 115 may thus reduce power consumption and conserve computational resources by reducing operating bandwidth (e.g., reduce operating bandwidth otherwise associated with monitoring of BWPs such as, for example NR BWPs). For instance, reduced capability UEs 115 may be able to transition to a NBWP (e.g., switch to a narrow BW) based on reduced amounts of data to be transferred, less frequent data transfers, etc., and thus may reduce bandwidth and power consumption during communications with a base station 105.

For example, a NBWP may share similar parameters with a BWP (e.g., such as an NR BWP) and may be established over a reduced bandwidth to support UEs 115 with reduced complexity features (e.g., such as UEs 115 with reduced bandwidth capabilities). The techniques described herein may provide for a UE transitioning to a NBWP (e.g., after initial cell search), as well as for a UE transitioning amongst NBWPs (e.g., subsequent transitions to other NBWPs after an initial transition to a NBWP after initial cell search). For instance, a UE 115 may initially transition to a NBWP (e.g., transition to monitor the NBWP for reference signals or to utilize the NBWP for uplink/downlink communications) to support reduced bandwidth capabilities of the UE 115. Subsequently, the UE 115 may transition amongst other NBWPs for network load balancing, UE frequency hopping gain, etc. (e.g., as well as to continue to leverage reduced UE bandwidth).

Figure 2:
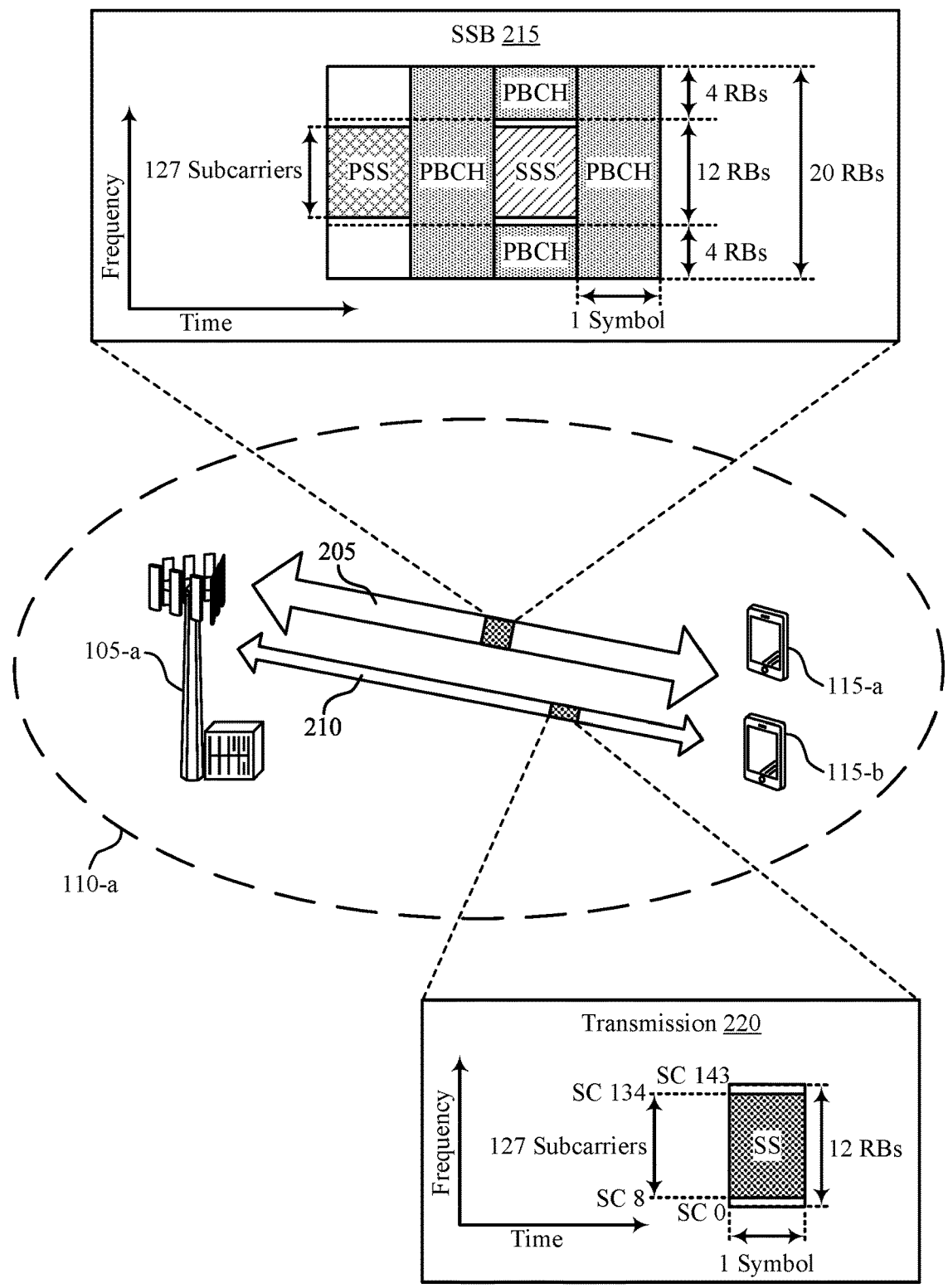
FIG. 2 illustrates an example of a wireless communications system that supports NBWP transitions for reduced capability devices in accordance with aspects of the present disclosure.

FIG. 2 illustrates an example of a wireless communications system 200 that supports NBWP transitions for reduced capability devices in accordance with aspects of the present disclosure. In some examples, wireless communications system 200 may implement aspects of wireless communications system 100. Wireless communications system 200 may include base station 105-a, UE 115-a, and UE 115-b, which may be examples of a base station 105 and UEs 115, respectively, as described with reference to FIG. 1. Base station 105-a and UE 115-b (e.g., a reduced capability UE 115) may be configured to use NBWPs 210 in accordance with the techniques described herein.

In some examples, base station 105-a may be an NR base station communicating via a link (e.g., such as BWP 205 and/or NBWP 210) with UE 115-a and UE 115-b within coverage area 110-a. For instance, connections may be established using a relatively wide channel frequency bandwidth. In some cases, one or more portions of the channel frequency bandwidth, such as BWPs 205 and/or NBWPs 210, may be used for communications with UEs 115. In the example of FIG. 2, a channel frequency bandwidth or a carrier bandwidth may include portions (e.g., BWPs 205) used for communications with UE 115-a and UE 115-b. Further, according to techniques described herein, a channel frequency bandwidth or a carrier bandwidth may include narrow portions (e.g., NBWPs 210) used for communications with UE 115-b (e.g., which may be an example of a reduced capability UE 115). BWPs 205 and NBWPs 210 may be associated with a same carrier bandwidth or may be associated with different carrier bandwidths (e.g., in some cases, communications by UE 115-a and UE 115-b may be associated with a same carrier bandwidth or with different carrier bandwidths).

For example, a first type of UE, such as a reduced capability UE 115-b (e.g., a low tier UE 115-b or an NR-Light UE 115-b) may include lower or reduced UE capabilities compared to a second type of UE, such as a generic UE 115-a (e.g., a full capability UE 115-a or a premium UE 115-a). As discussed herein, NBWPs 210 may reduce bandwidth (e.g., compared to BWPs 205) and support functionality for reduced capability UEs such as reduced capability UE 115-b. NBWPs 210 may provide for reduced bandwidth and lower computational complexity (e.g., and reduced power consumption) for a reduced capability UE 115-b, as reduced capability UE 115-b may be configured with a NBWP 210 and may not be configured to continuously monitor, decode, etc. the larger spanning bandwidth associated with BWPs 205. Further, utilization of such NBWPs 210 may, in some cases, support narrower beams for enhanced coverage.

Wireless communications system 200 may support such reduced capability devices, which may enable less complex design, cheaper manufacturing, etc. suitable for some applications (e.g., such as wearable device applications, video surveillance applications, or industrial sensor applications). For instance, some UEs (e.g., UE 115-b) may be designed for applications associated with relatively infrequent data transfers, relatively reduced data throughput requirements, etc. (e.g., compared to other wireless communication applications within the wireless communications system 200). As an example, UE 115-b may include a video surveillance device that may upload data (e.g., data recorded off-line) to a server relatively infrequently (e.g., such as once or twice a day). Utilization of NBWPs 210 within wireless communications system 200 may allow reduced complexity devices, such as UE 115-b, to be designed with reduced bandwidth capabilities that may be suitable for such applications (e.g., and thus reduced complexity devices may be designed more cost effectively, more computationally efficient, etc. for various applications within wireless communications system 200).

In some examples, NBWPs 210 may share similar parameters (e.g., protocol features, numerologies, or modulation schemes) with BWPs 205 (e.g., such as NR BWPs 205) so as to minimize physical layer disruptions within wireless communications system 200. In other examples, NBWPs 210 may have different parameters than BWPs 205. Generally, the NBWPs 210 may be of smaller (e.g., less) bandwidth than BWPs 205 and may include smaller (e.g., less) reference signal bandwidth (e.g., or SSB bandwidth). For instance, in the example of FIG. 2, base station 105-a may transmit an SSB 215 to UE 115-a and/or UE 115-b via BWP 205. The SSB 215 (e.g., and BWP 205) may include or span 20 resource blocks (RBs) in the frequency domain. Further, in other scenarios, base station 105-a may transmit a transmission 220 (e.g., a reduced bandwidth SSB or a reduced bandwidth physical downlink shared channel (PDSCH) transmission) to UE 115-b via NBWP 210. The transmission 220 (e.g., and the NBWP 210) may include or span, for example, 12 RBs in the frequency domain. In some systems, BWPs 205 configurable within a carrier bandwidth may be limited (e.g., to four BWPs 205 per carrier bandwidth). According to some aspects of the described techniques, more NBWPs 210 may be configured per carrier bandwidth than BPWs to accommodate reduced capability UEs 115.

The example configuration (e.g., frequency domain aspects or time domain aspects) of BWP 205 and NBWP 210 are illustrated for descriptive purposes and are not intended to be limiting in regard to the scope of the present disclosure. BWPs 205 and NBWPs 210 may be configured with varying bandwidths, may include various other signals or transmissions, may be configured for more or less UEs 115, may be configured in greater numbers, etc., by analogy, without departing from the scope of the present disclosure.

Wireless communications system 200 may support NBWPs 210 and UE 115 (e.g., UE 115-b) transitions to NBWPs 210. The techniques described herein may provide for UE 115 transitioning to a NBWP 210 (e.g., after initial cell search), as well as for UE 115 transitioning amongst other NBWPs 210 (e.g., subsequent transitions to other NBWPs 210 after an initial transition to a NBWP 210 after initial cell search). As used herein, a UE 115 transitioning to a NBWP 210 may generally refer to a UE 115 transitioning to monitor the NBWP 210 for transmissions 220 (e.g., for reduced bandwidth signals), to a UE 115 utilizing the NBWP 210 for transmissions 220 (e.g., uplink/downlink communications), etc. For example, UE 115-b may transition to a NBWP 210 to monitor for and/or receive reduced bandwidth reference signals, reduced bandwidth SSBs, reduced bandwidth PDSCH transmissions, etc. Further, UE 115-b may transition to a NBWP 210 to transmit reduced bandwidth physical uplink shared channel (PUSCH) transmissions, reduced bandwidth physical uplink control channel (PUCCH) transmissions, etc.

Wireless communications system 200 may employ load balancing techniques for both initial NBWP 210 transitions as well as subsequent transitions between NBWPs 210. For example, due to a potentially large number of reduced capability UEs 115 (e.g., in industrial sensor systems), wireless communications system 200 may employ techniques for balancing distribution of reduced capability UEs 115 across NBWPs 210. Further, wireless communications system 200 may support an increased number of (e.g., greater than four) NBWPs 210. Available NBWPs frequency locations and corresponding bandwidth may be signaled to UEs 115 in a system information block (SIB) or in dedicated RRC signaling. The network may control or UEs may initiate initial transitions to a NBWP 210 and subsequent transitions amongst NBWPs 210 according to the various techniques described here.

According to some aspects of the described techniques, UE 115-b may initially transition to a NBWP 210 after cell search. For example, after the initial cell search, beam selection (P1), and reading SIB1, UE 115-b may transition to a NBWP 210. Generally, reduced capability UE 115 transition to NBWPs 210 may be performed after random access channel (RACH), after reading SIBs (e.g., such that the RACH procedure may be performed after transition to the new NBWP 210), or anytime in connected or idle modes. Wireless communications system 200 may preconfigure when a reduced capability UEs 115 perform an initial transition to a NBWP 210, a base station 105-a may indicate to a reduced capability UE 115 when the reduced capability UE 115 is to perform an initial transition to a NBWP 210, or a reduced capability UE 115 may autonomously decide when to perform an initial transition to a NBWP 210 (e.g., based on when the UE 115 has enough cell information or NBWP 210 information to transition).

An initial transition to a NBWP 210 may refer to a transition to a NBWP 210 upon detecting a cell, a transition to a NBWP 210 upon reconnection to a cell, etc. (e.g., such that a reduced capability UE 115-b may transition to an initial NBWP 210 based on a cell search or cell acquisition). In some examples, a reduced capability UE may monitor a larger set of physical resource blocks for cell search. For example, UE 115-b may monitor a carrier bandwidth, a BWP 205, or some other bandwidth and may receive a synchronization signal (e.g., a PSS of SSB 215) based on the monitoring. The UE 115-b may perform cell acquisition (e.g., detect the cell or select a beam) based on the detected SSB 215. After which, UE 115-b may perform an initial transition (e.g., transition to an initial) NBWP 210 according to the techniques described herein.

For example, in some cases, an SSB 215 may be a cell defining SSB. For example, within the frequency span of a carrier, multiple SSBs 215 may be transmitted by the base station 105-a to UEs 115. The Physical Cell Identifiers (PCIs) of SSBs 215 transmitted in different frequency locations may not necessarily be unique to the cell. Thus, the PCIs may not be the same, and different SSBs in the frequency domain may have different PCIs. When an SSB 215 is associated with remaining minimum system information (RMSI), the SSB 215 may correspond to an individual cell, which may have a unique NR Cell Global Identifier (NCGI). Such an SSB 215 with the unique NCGI may be referred to as a cell defining SSB. In some cases, cell selection and/or reselection, by a UE 115, may be based on one or more reference signal receive power (RSRP) or reference signal receive quality (RSRQ) measurements of the cell defining SSB. In some examples, after a UE 115 receives the SSB 215, the UE 115 may decode the SSB 215 to identify the master information block (MIB). The MIB may indicate the CORESET and synchronization signal configuration, which may allow the UE 115 to receive and decode the PDCCH. The PDCCH may indicate the PDSCH to the UE 115, which may include the SIB that includes the RMSI.

Generally, cell acquisition performed by the reduced capability UE 115-b may refer to detection of the SSB 215, and the UE 115-b may perform the initial transition to the NBWP 210 at various stages discussed above. For instance, the UE 115-b may detect the SSB 215 and may transition to the NBWP 210 after a RACH procedure following SIB, after reading SIBs and before a RACH procedure (e.g., such that a RACH procedure may be performed after transition to the new NBWP 210), after reading all RMSI, any time in a RRC connected mode, any time in a RRC idle mode, etc. As discussed herein, in some cases the SIB may include NBWP 210 configuration information (e.g., NBWP indices, NBWP frequency locations, or NBWP bandwidths). Additionally or alternatively, NBWP 210 configuration information may be conveyed via RRC signaling.

Subsequently, after an initial transition to a NBWP 210, the UE 115-b may transition amongst other NBWPs 210 (e.g., for network load balancing, UE frequency hopping gain, or to continue to leverage reduced UE bandwidth). Such subsequent transitions between NBWPs 210 may be configured semi-persistently, periodically, aperiodically, randomly, or some combination thereof (e.g., wireless communications system 200 may support, as an example, periodic transitions of UE 115-b between NBWPs 210 for frequency hopping gains in addition to aperiodic transitions of UE 115-b to an indicated NBWP 210 based on load balancing configurations by the network). In some examples (e.g., in semi-persistent and/or aperiodic NBWP transition examples), base station 105-b may indicate a new (e.g., a next or subsequent) target NBWP 210 for UE 115-b transitioning. In other examples (e.g., in random and/or periodic NBWP 210 transition examples), UE 115-b may transition amongst NBWPs based on a NBWP transitioning pattern (e.g., which may be preconfigured by the network), based on random selection (e.g., based on some preconfigured or network indicated probability distribution), etc.

Figure 3:
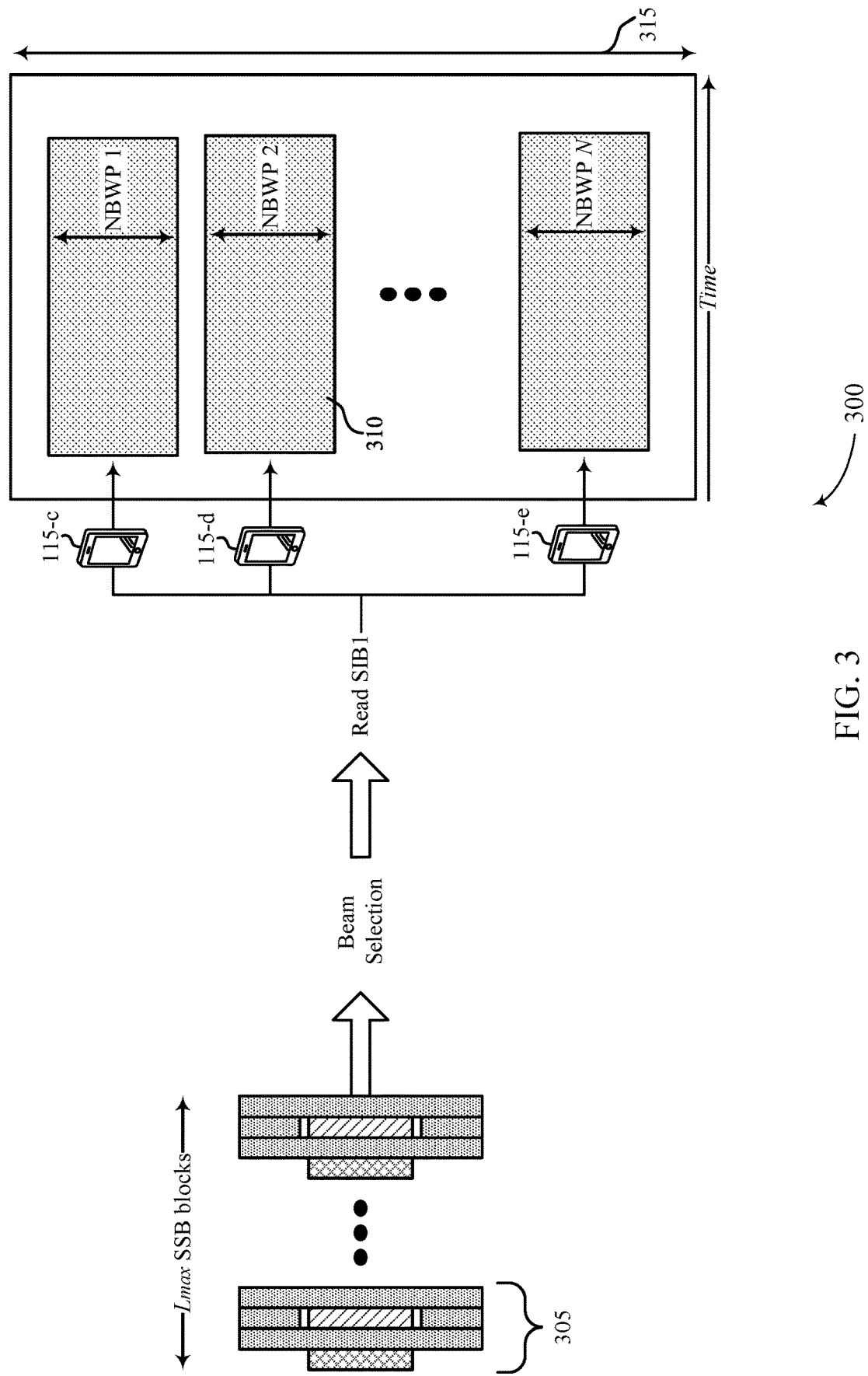
FIG. 3 illustrates an example of a NBWP transition diagram that supports NBWP transitions for reduced capability devices in accordance with aspects of the present disclosure.

FIG. 3 illustrates an example of a NBWP transition diagram 300 that supports NBWP transitions for reduced capability devices in accordance with aspects of the present disclosure. In some examples, NBWP transition diagram 300 may implement aspects of wireless communications system 100 and/or wireless communications system 200. For example, NBWP transition diagram 300 may include UE 115-c, UE 115-d, and UE 115-e, which may be examples of UEs 115 as described with reference to FIG. 1. UE 115-c, UE 115-d, and UE 115-e (e.g., reduced capability UEs 115) may be configured to use NBWPs 310 in accordance with the techniques described herein. NBWP transition diagram 300 may illustrate aspects of initial NBWP transition (e.g., initial transition to a NBWP 310 after detection of an SSB 305) as well as subsequent NBWP transitioning (e.g., subsequent transitions to other NBWPs 310).

Some wireless communications systems may utilize SSBs 305 with beam sweeping for synchronization purposes. For example, a base station may beam sweep some set of SSBs 305 (e.g., $L_{max}$ SSBs 305) in a carrier bandwidth. The number of different beams used by a base station may be determined based on how many SSBs 305 are transmitted within an SSB Burst Set (e.g., a set of SSBs 305 being transmitted in 5 ms window of SSB transmission). The parameter defining the maximum number of SSBs 305 within an SSB set may be referred to as $L_{max}$. In some examples, UEs 115 may monitor some bandwidth region for SSBs 305 (e.g., a set of physical resource blocks corresponding to SSBs 305) when searching for a cell. In such cases, for a cell acquisition procedure, a UE 115 may receive an SSB 305 based on monitoring the bandwidth region for SSBs 305 to obtain PCI, time alignment, select a beam, etc.

In the example of FIG. 3, a UE 115 (e.g., a reduced capability UE 115) may monitor for and receive an SSB 305. For example, a UE 115 may monitor some bandwidth region for SSBs 305, may receive a PSS, and may detect the presence of the SSB 305 based on decoding the PSS (e.g., the PSS may indicate the SSB 305 and may result in UE 115 decoding of PBCH and SSS of the SSB 305). A reduced capability UE 115 may then select a beam based on one or more detected SSBs 305 (e.g., based on RSRP or RSRQ measurements of beam swept cell defining SSBs 305). The UE 115 may read SIB1, and may transition to an initial NBWP in accordance with the techniques described herein. Such is shown for illustrative purposes and, as discussed, generally the described techniques provide for UE initial transitions to a NBWP 310 at various stages of cell acquisition (e.g., after a RACH procedure, after RMSI reading, etc., in addition to after reading SIB1 as illustrated by the present example). In some examples, SIB1 or RRC signaling may include NBWP configuration information (e.g., NBWP 310 indices, NBWP 310 center frequencies, or NBWP 310 bandwidths). As discussed, NBWPs 310 may be distributed across a carrier bandwidth 315 and may include some N number of NBWPs 310 (e.g., where, in some cases, N>4).

In some examples, the initial transition of a UE 115 to a NBWP 310 (e.g., and by extension the distribution of several UEs 115 into NBWPs 310) may be configured by the network (e.g., by a base station 105). For example, in some cases, the network may signal an indication of an initial NBWP 310 (e.g., such as a target NBWP index or a NBWP frequency location and bandwidth) per UE 115, or per group of UEs 115, via RRC signaling, downlink control information (DCI), or medium access control (MAC) control element (MAC CE). For example, UE 115-c, UE 115-d, and UE 115-e may transition to NBWP 1, NBWP 2, and NBWP N, respectively, based on such network signaling (e.g., for load balancing of the UEs 115 across the N NBWPs 310). In some cases, the signaled indications of initial NBWPs 310 for a UE 115 may be indicated by the network after the initial cell search (e.g., after beam selection, after reading a SIB, after a RACH procedure, etc., depending on implementation). In some cases, the network may select initial NBWPs 310 for initial UE transition based on load balancing considerations, identified frequency interference (e.g., if interference is identified in a frequency band associated with some NBWP 3, the network may avoid indicating NBWP 3 to UEs 115 for initial transitions), etc.

In other examples, the initial transition of a UE 115 to a NBWP 310 may be UE 115 initiated. For instance, a UE 115 may select a NBWP 310 for initial transition to the NBWP 310 based on a hashing function (e.g., between a NBWP index and an international mobile subscriber identity (IMSI) of the UE and/or a radio network temporary identifier (RNTI) of the UE), or the UE may randomly select an available NBWP based on a probability distribution (e.g., that may be preconfigured by the network or otherwise indicated by the network). In some cases, by extension to other reduced capability UEs acquiring the cell, the distribution of several UEs 115 into NBWPs may be relatively balanced. For example, upon detecting the cell, each of UE 115-c, UE 115-d, and UE 115-e may initiate transition to a NBWP 310 and may identify which NBWP 310 index to transition to (e.g., using their independent UE IMSI and/or RNTI in the hashing function, respectively). In other examples, each of UE 115-c, UE 115-d, and UE 115-e may initiate transition to a NBWP 310 and may identify which NBWP 310 index to transition to randomly according to a probability distribution, such that UE 115-c, UE 115-d, and UE 115-e may (e.g., probabilistically) randomly select different NBWPs 310 for initial transitions. In other words, probability distributions using for random (e.g., pseudo random) selection of NBWPs 310 may be uniform across UE 115-c, UE 115-d, and UE 115-e.

In cases where initial transition of UEs 115 to NBWPs 310 is UE initiated, hashing functions and/or probability distributions may be preconfigured by the network (e.g., and UE 115-c, UE 115-d, and UE 115-e may reference a look-up table (LUT) upon detecting a cell and preparing to perform an initial transition to an initial NBWP 310) or may be signaled by the network.

According to other aspects of the described techniques, a UE 115 may (e.g., after initial transition to a NBWP 310) subsequently transition amongst other NBWPs 310. For example, UE 115-c may initially transition to NBWP 1, and may subsequently transition to, for example, NBWP 2 according to the techniques described herein. Such subsequent transitions between NBWPs 310 may be configured semi-persistently, periodically, aperiodically, randomly, or some combination thereof (e.g., wireless communications systems may support, as an example, periodic UE 115 transitions between NBWPs for frequency hopping gains in addition to aperiodic UE 115 transitions to an indicated NBWP based on load balancing configurations by the network).

For semi-persistent configuration of subsequent UE 115 transition amongst NBWPs 310, the network may signal a new target NBWP index (or explicit NBWP location and bandwidth) using either RRC signaling, DCI, or MAC CE (e.g., which can be done per UE 115 or for a group of UEs 115). For semi-persistent configuration, in some cases, a UE 115 may remain on (e.g., continue monitoring or utilizing) the indicated NBWP 310 until the network changes it.

For aperiodic configuration of subsequent UE 115 transition amongst NBWPs 310, the network may signal a new target NBWP index (or explicit NBWP location and bandwidth) per UE 115 per grant. For example, an uplink or downlink grant for a UE 115 may include an indication of a NBWP 310 to aperiodically transition the UE 115 to a subsequent NBWP 310 for the uplink or downlink communication associated with the grant. For such an aperiodic configuration, in some cases, a UE 115 may remain on (e.g., continue monitoring or utilizing) the indicated NBWP 310 until the network changes it For random (e.g., NBWP hopping) configuration of subsequent UE 115 transition amongst NBWPs 310, UEs 115 may randomly select and transition into one of the available NBWPs 310 based on a predefined/signaled probability distribution. For periodic configuration of subsequent UE 115 transition amongst NBWPs 310, the network may define a NBWP pattern in time (e.g., NBWP 1→NBWP 3→NBWP 4→NBWP 1→NBWP 3→NBWP 4, as well as some time for remaining on each NBWP).

As such, UE 115-c, UE 115-d, and UE 115-e may detect a cell and initially transition to a NBWP 310 according to the various techniques described herein. Further, UE 115-c, UE 115-d, and UE 115-e may subsequently transition amongst NBWPs 310 according to the various techniques described herein. Generally, the network may signal various NBWP hopping patterns, various hashing functions, various probability distributions, various explicit indications of an initial NBWP 310 for a UE initial transition, various explicit indications of subsequent NBWP 310 for a UE transition, etc. based on the number of UEs 115 on the cell, based on the number of NBWPs 310, based current distributions of UEs 115 across the NBWPs 310, based on load balancing techniques, based on identified frequency interference that may be associated with any of the NBWPs 310, based on target gains from frequency hopping, based on UEs 115 entering or leaving the cell, based on priority or services associated with some UEs 115, based on measured channel conditions or quality conditions associated with the NBWPs 310, etc.

Figure 4:
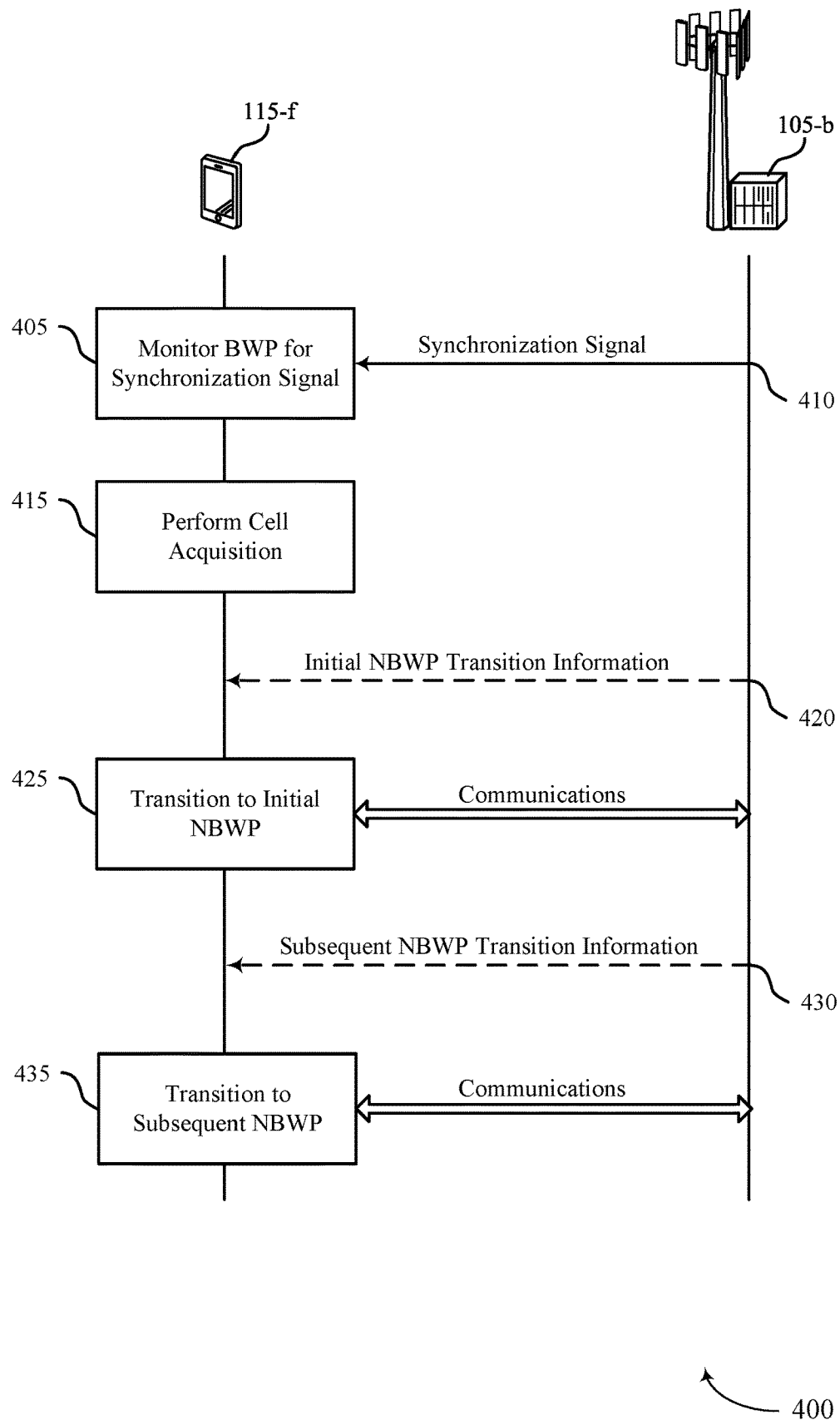
FIG. 4 illustrates an example of a process flow that supports NBWP transitions for reduced capability devices in accordance with aspects of the present disclosure.

FIG. 4 illustrates an example of a process flow 400 that supports NBWP transitions for reduced capability devices in accordance with aspects of the present disclosure. In some examples, process flow 400 may implement aspects of wireless communications system 100, wireless communications system 200, and/or NBWP transition diagram 300. Process flow 400 may be implemented by a UE 115-f and a base station 105-b, which may be examples of a UE 115 and a base station 105 described with reference to FIGS. 1-3. In some cases, UE 115-f may be an example of a reduced capability UE. In the following description of the process flow 400, the operations between UE 115-f and base station 105-b may be transmitted in a different order than the order shown, or the operations performed by base station 105-b and UE 115-f may be performed in different orders or at different times. Some operations may also be left out of the process flow 400, or other operations may be added to the process flow 400. It is to be understood that while base station 105-b and UE 115-f are shown performing a number of the operations of process flow 400, any wireless device may perform the operations shown.

At 405, UE 115-f may monitor a first set of physical resource blocks (e.g., a first BWP or a carrier bandwidth). For example, in some cases, UE 115-f may monitor the first set of physical resource blocks in search of a cell (e.g., for initial cell search) associated with base station 105-b). At 410, UE 115-f may receive a synchronization signal (e.g., a PSS or an SSB) based at least in part on monitoring the first set of physical resource blocks.

At 415, UE 115-f may perform cell acquisition based on the received synchronization signal. Generally, cell acquisition may refer to detecting the cell, a beam selection procedure, obtaining PCI, a time alignment procedure, reading SIB1, performing a RACH procedure, or some combination thereof. For instance, in some examples, UE 115-f may detect the cell, select a beam (e.g., based on RSRP measurements performed during 405 of beam swept SSBs from base station 105-b), and proceed to 425. In other examples, UE 115-f may detect the cell, select a beam, perform a RACH procedure with base station 105-b, and then proceed to 425.

For instance, in some examples, UE 115-f may perform a RACH procedure with the base station based on the performed cell acquisition and proceed to 425 (e.g., transition to the first NBWP) based on performing the RACH procedure. In other examples, UE 115-f may decode one or more SIBs (e.g., at 405) and may proceed to 425 based on the decoding of the one or more SIBs (e.g., and further, in such examples, UE 115-*f* may perform a RACH procedure with base station 105-*b* after the transitioning to the first NBWP). In some examples, UE 115-*f* may transition to an RRC connected mode or an RRC idle mode, based on the performed cell acquisition at 415, may proceed to 425 based on the RRC connected mode or the RRC idle mode.

At 420, in some cases, base station 105-*b* may transmit initial NBWP transition information to UE 115-*f*. As discussed in the various examples described herein, base station 105-*b* may transmit both initial NBWP transition information and subsequent NBWP transition information (e.g., at 430) using different methods (e.g., such as via RRC, MAC CE, or DCI) or in some cases may not transmit one or both of initial NBWP transition information and subsequent NBWP transition information at all. In some cases, transmission of initial NBWP transition information at 420 and transmission of synchronization signal at 410 may be a single operation.

For example, in cases where a SIB includes an indication of an initial NBWP index and the cell acquisition at 415 includes SIB decoding, the initial NBWP transition information may be identified during the cell acquisition procedure at 415. In other examples, some wireless communications system may preconfigure a default initial NBWP, such that base station 105-*b* may not transmit any initial NBWP transition information at all. In yet other examples, base station 105-*b* may transmit initial NBWP transition information at 420 via RRC signaling, DCI, or a MAC CE. Initial NBWP transition information may include an indication of an index associated with the first NBWP, a center frequency associated with the first NBWP and a bandwidth associated with the first NBWP, a hashing function between an index associated with the first NBWP and an IMSI or a RNTI of the UE, probability distribution for random selection of a first NBWP, a frequency location for each of one or more NBWPs (e.g., information on the larger set of NBWPs that includes the first NBWP), etc., any of which information may be used by UE 115-*f* for identification or selection of a first NBWP for an initial transition as discussed herein.

At 425, UE 115-*f* may transition from monitoring the first set of physical resource blocks (e.g., the first BWP) to monitoring the first NBWP (e.g., the first subset of physical resource blocks) based on the cell acquisition at 415 (e.g., where the first NBWP is associated with less bandwidth than the first BWP). In some cases, the initial transition may be based on a NBWP index or center frequency and bandwidth associated with the first NBWP indicated by base station 105-*b* (e.g., indicated via RRC signaling at 420 or SIB at 410 and/or 420). In some cases, the initial transition may be based on a hashing function or probability distribution (e.g., which may be preconfigured by the wireless communications system, may be received from base station 105-*b* via RRC signaling at 420, or may be received from base station 105-*b* SIB at 410 and/or 420). Accordingly, UE 115-*f* and base station 105-*b* may communicate via the first NBWP (e.g., UE 115-*f* may communicate with base station 105-*b* based on data received via the first NBWP).

At 430, in some cases, base station 105-*b* may transmit subsequent NBWP transition information to UE 115-*f*. As discussed in the various examples described herein, base station 105-*b* may transmit subsequent NBWP transition information using different methods (e.g., such as via RRC, MAC CE, or DCI) or in some cases may not transmit subsequent NBWP transition information at all. For example, in some cases, base station 105-*b* may semi-persistently (e.g., via RRC signaling) or aperiodically (e.g., within a grant for uplink or downlink communications) indicate a NBWP index or a center frequency and bandwidth associated with a second NBWP. Alternatively (e.g., for periodic or random transitions to subsequent NBWPs), base station 105-*b* may not transmit any additional NBWP transition information (e.g., any subsequent NBWP transition information) to UE 115-*f*, and UE 115-*f* may transition to the second NBWP based on a hashing function or probability distribution (e.g., which may be preconfigured by the wireless communications system, may be received from base station 105-*b* via RRC signaling at 420, or may be received from base station 105-*b* SIB at 410 and/or 420). Accordingly, UE 115-*f* and base station 105-*b* may communicate via the second NBWP (e.g., UE 115-*f* may communicate with base station 105-*b* based on data received via the second NBWP).

Figure 5:
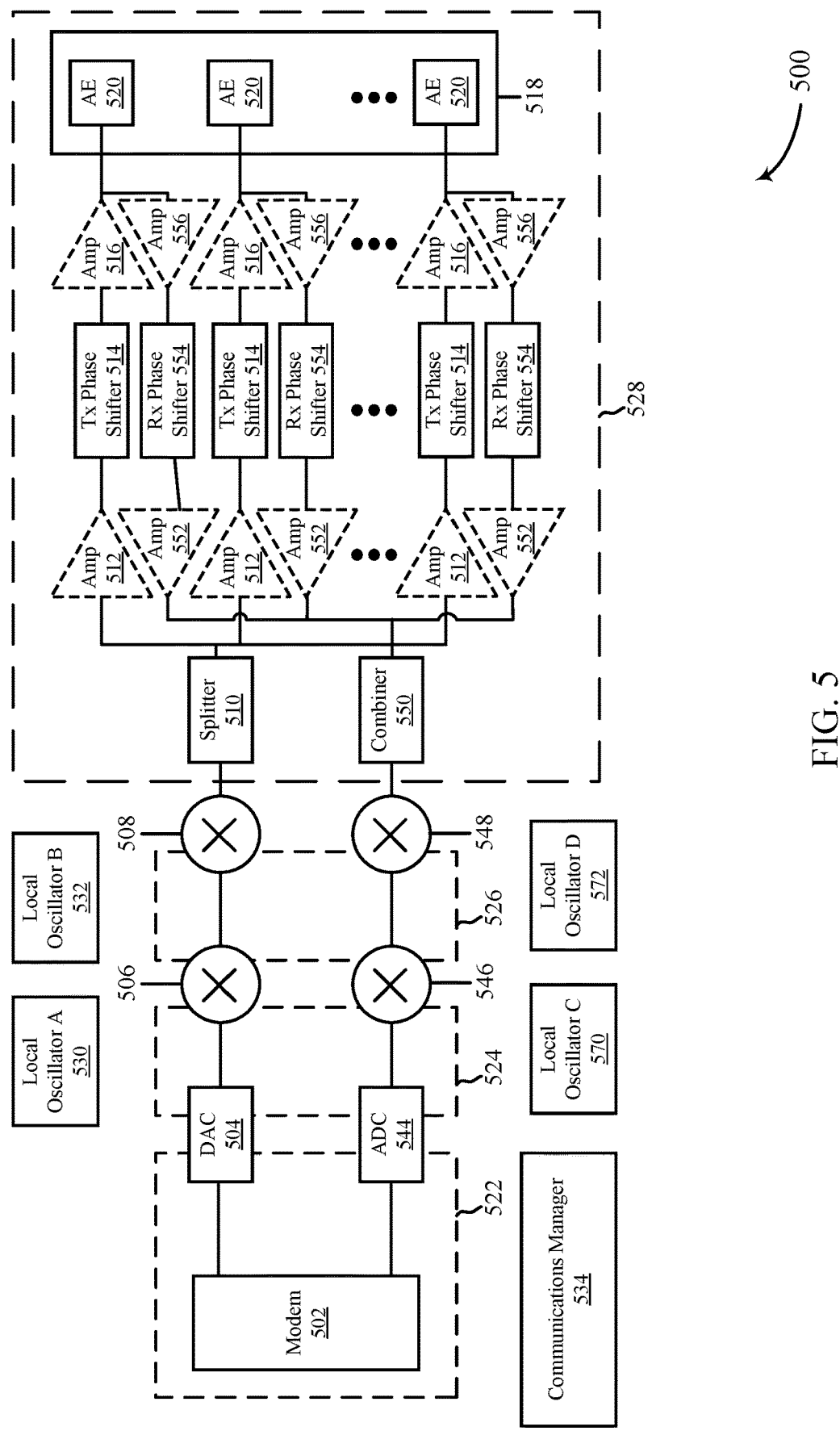
FIG. 5 illustrates an example of an architecture that supports NBWP transitions for reduced capability devices in accordance with aspects of the present disclosure.

FIG. 5 illustrates an example of architecture 500 that supports determining sub-dominant clusters in a mmW channel in accordance with aspects of the present disclosure. In some examples, architecture 500 may implement aspects of wireless communications systems 100, wireless communications system 200, NBWP transition diagram 300, and/or process flow 400. In some aspects, architecture 500 may be an example of a transmitting device (e.g., which may be a base station 105 or a UE 115) and/or a receiving device (e.g., which may also be a base station 105 or a UE 115) as described herein.

Broadly, FIG. 5 is a diagram illustrating example hardware components of a wireless device in accordance with some aspects of the disclosure. The illustrated components may include those that may be used for antenna element selection and/or for beamforming for transmission of wireless signals. There are numerous architectures for antenna element selection and implementing phase shifting, one example of which is illustrated here. The architecture 500 includes a modem (modulator/demodulator) 502, a digital to analog converter (DAC) 504, a first mixer 506, a second mixer 508, and a splitter 510. The architecture 500 also includes a set of first amplifiers 512, a set of phase shifters 514, a set of second amplifiers 516, and an antenna array 518 that includes a set of antenna elements 520. Transmission lines or other waveguides, wires, traces, or the like are shown connecting the various components to illustrate how signals to be transmitted may travel between components. Boxes 522, 524, 526, and 528 indicate regions in the architecture 500 in which different types of signals travel or are processed. Specifically, box 522 indicates a region in which digital baseband signals travel or are processed, box 524 indicates a region in which analog baseband signals travel or are processed, box 526 indicates a region in which analog intermediate frequency (IF) signals travel or are processed, and box 528 indicates a region in which analog radio frequency (RF) signals travel or are processed. The architecture also includes a local oscillator A 530, a local oscillator B 532, and a communications manager 534.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases, some processing or filtering (not shown) may take place at the IF. The second mixer 508 upconverts the analog IF signals to analog RF signals using the local oscillator B 532. Similarly to the first mixer, the second mixer 508 may mix the signals with an oscillating signal generated by the local oscillator B 532 to "move" the IF analog signals to the RF, or the frequency at which signals will be transmitted or received. The modem 502 and/or the communications manager 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into a set of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some implementations. In one implementation, both the first amplifier 512 and second amplifier 516 are present. In another, neither the first amplifier 512 nor the second amplifier 516 is present. In other implementations, one of the two amplifiers 512, 516 is present but not the other. By way of example, if the splitter 510 is an active splitter, the first amplifier 512 may not be used. By way of further example, if the phase shifter 514 is an active phase shifter that can provide a gain, the second amplifier 516 might not be used. The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or communications manager 534) to provide independent control of the gain for each antenna element 520. For example, the modem 502 and/or the communications manager 534 may have at least one control line connected to each of the splitter 510, first amplifiers 512, phase shifters 514, and/or second amplifiers 516 which may be used to configure a gain to provide a desired amount of gain for each component and thus each antenna element 520.

The phase shifter 514 may provide a configurable phase shift or phase offset to a corresponding RF signal to be transmitted. The phase shifter 514 could be a passive phase shifter not directly connected to a power supply. Passive phase shifters might introduce some insertion loss. The second amplifier 516 could boost the signal to compensate for the insertion loss. The phase shifter 514 could be an active phase shifter connected to a power supply such that the active phase shifter provides some amount of gain or prevents insertion loss. The settings of each of the phase shifters 514 are independent meaning that each can be set to provide a desired amount of phase shift or the same amount of phase shift or some other configuration. The modem 502 and/or the communications manager 534 may have at least one control line connected to each of the phase shifters 514 and which may be used to configure the phase shifters 514 to provide a desired amounts of phase shift or phase offset between antenna elements 520.

In the illustrated architecture 500, RF signals received by the antenna elements 520 are provided to one or more of first amplifier 556 to boost the signal strength. The first amplifier 556 may be connected to the same antenna arrays 515, e.g., for TDD operations. The first amplifier 556 may be connected to different antenna arrays 515. The boosted RF signal is input into one or more of phase shifter 554 to provide a configurable phase shift or phase offset for the corresponding received RF signal. The phase shifter 554 may be an active phase shifter or a passive phase shifter. The settings of the phase shifters 554 are independent, meaning that each can be set to provide a desired amount of phase shift or the same amount of phase shift or some other configuration. The modem 502 and/or the communications manager 534 may have at least one control line connected to each of the phase shifters 554 and which may be used to configure the phase shifters 554 to provide a desired amount of phase shift or phase offset between antenna elements 520.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signal input to combiner 550 have the same magnitude. The amplifiers 552 and/or 556 are illustrated in dashed lines because they might not be necessary in some implementations. In one implementation, both the amplifier 552 and the amplifier 556 are present. In another, neither the amplifier 552 nor the amplifier 556 are present. In other implementations, one of the amplifiers 552, 556 is present but not the other.

In the illustrated architecture 500, signals output by the phase shifters 554 (via the amplifiers 552 when present) are combined in combiner 550. The combiner 550 in architecture combines the RF signal into a signal, as denoted by its presence in box 525. The combiner 550 may be a passive combiner, e.g., not connected to a power source, which may result in some insertion loss. The combiner 550 may be an active combiner, e.g., connected to a power source, which may result in some signal gain. When combiner 550 is an active combiner, it may provide a different (e.g., configurable) amount of gain for each input signal so that the input signals have the same magnitude when they are combined. When combiner 550 is an active combiner, it may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to analog signals. The analog signals output from ADC 544 is input to modem 502 for baseband processing, e.g., decoding, de-interleaving, etc.

The architecture 500 is given by way of example to illustrate an architecture for transmitting and/or receiving signals. It will be understood that the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although a single antenna array 518 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions.

Furthermore, mixers, splitters, amplifiers, phase shifters and other components may be located in different signal type areas (e.g., different ones of the boxes 522, 524, 526, 528) in different implemented architectures. For example, a split of the signal to be transmitted into a set of signals may take place at the analog RF, analog IF, analog baseband, or digital baseband frequencies in different examples. Similarly, amplification, and/or phase shifts may also take place at different frequencies. For example, in some contemplated implementations, one or more of the splitter 510, amplifiers 512, 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512, 516. By way of another example, a phase shift may be implemented by the second mixer 508 to obviate the need for a separate phase shifter 514. This technique is sometimes called local oscillator phase shifting. In one implementation of this configuration, there may be a set of IF to RF mixers (e.g., for each antenna element chain) within the second mixer 508 and the local oscillator B 532 would supply different local oscillator signals (with different phase offsets) to each IF to RF mixer.

The modem 502 and/or the communications manager 534 may control one or more of the other components 504-572 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using a set of signals on different antenna elements where one or more or all of the set signals are shifted in phase relative to each other. The formed beam may carry physical or higher layer reference signals or information. As each signal of the set of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512, 516 of the set of signals relative to each other.

The communications manager 534 may, when architecture 500 is configured as a transmitting device, determine a spatial separation distance between at least two transmitting entities or at least two receiving entities, determine a rank associated with a beam direction based on the spatial separation distance for the at least two transmitting entities or the at least two receiving entities, and transmit at least two uncorrelated signals over the beam direction based on the rank associated with the beam direction, as discussed herein. The communications manager 534 may, when architecture 500 is configured as a receiving device, transmit an indication of a beam direction and a rank associated with the beam direction and receive at least one signal over the beam direction based on the rank associated with the beam direction. The communications manager 534 may, when architecture 500 is configured as a receiving device, receive an indication of a beam direction and a rank associated with the beam direction and receive at least two uncorrelated signals over the beam direction based on the rank associated with the beam direction. The communications manager 534 may be located partially or fully within one or more other components of the architecture 500. For example, the communications manager 534 may be located within the modem 502 in at least one implementation.

Figure 6:
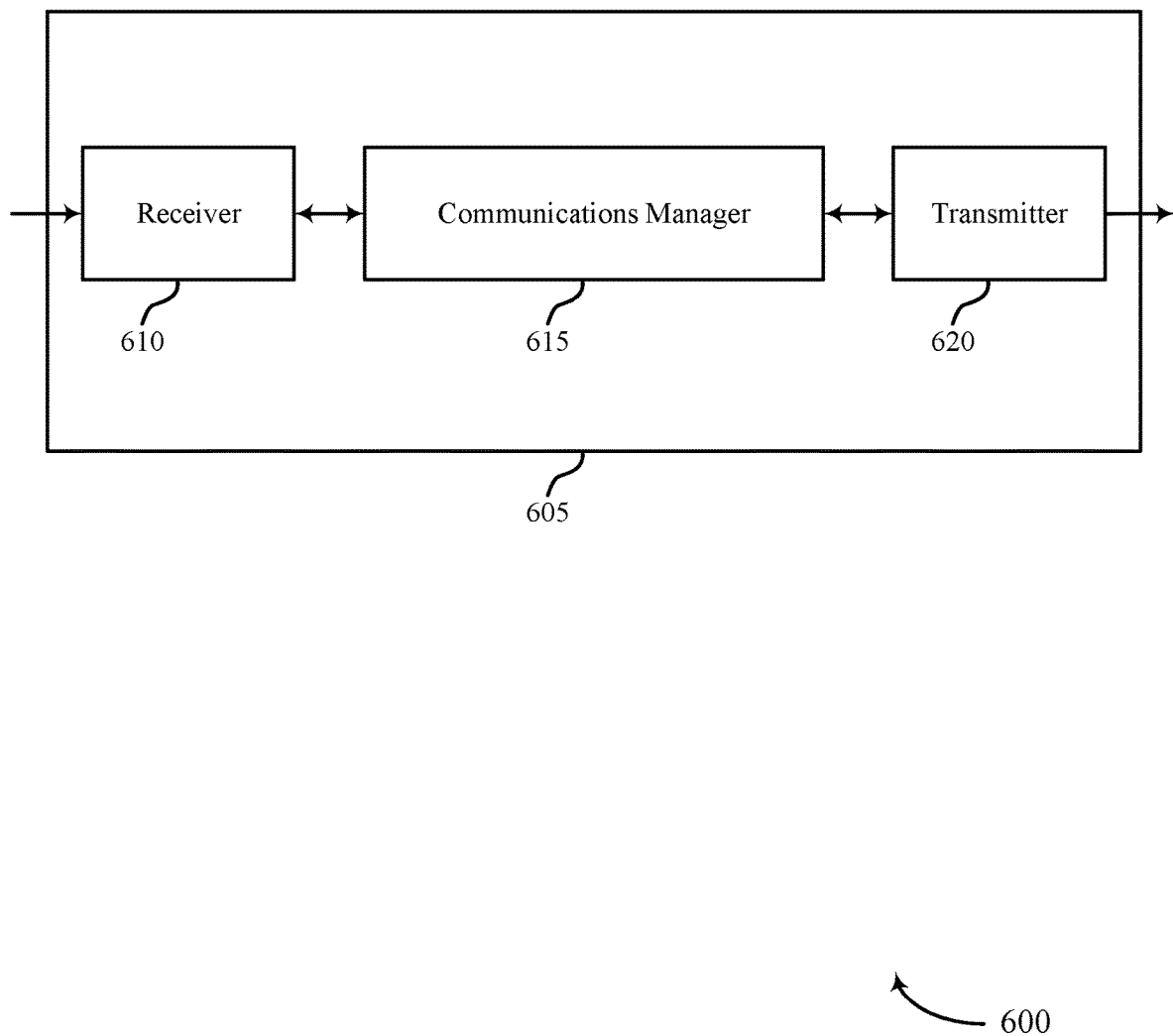
FIGS. 6 and 7 show block diagrams of devices that support NBWP transitions for reduced capability devices in accordance with aspects of the present disclosure.

FIG. 6 shows a block diagram 600 of a device 605 that supports NBWP transitions for reduced capability devices in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to NBWP transitions for reduced capability devices). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a synchronization signal by monitoring a first set of physical resource blocks, perform cell acquisition based on the received synchronization signal, transition from monitoring the first set of physical resource blocks to monitoring a first subset of physical resource blocks based on the cell acquisition, where the first subset of physical resource blocks is associated with less bandwidth than the first set of physical resource blocks, and communicate with a base station based on data received via the first subset of physical resource blocks. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 615 in accordance with examples as described herein, the device 605 (e.g., a processor controlling or otherwise coupled to the receiver 610, the transmitter 620, the communications manager 615, or any combination thereof) may support techniques for reduced power consumption. For example, a device 605 may transition to an initial NBWP and/or transition to subsequent NBWPs which may decrease the computation burden on the device 605 when compared to monitoring and utilizing a BWP which may include more resources than the NBWPs.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
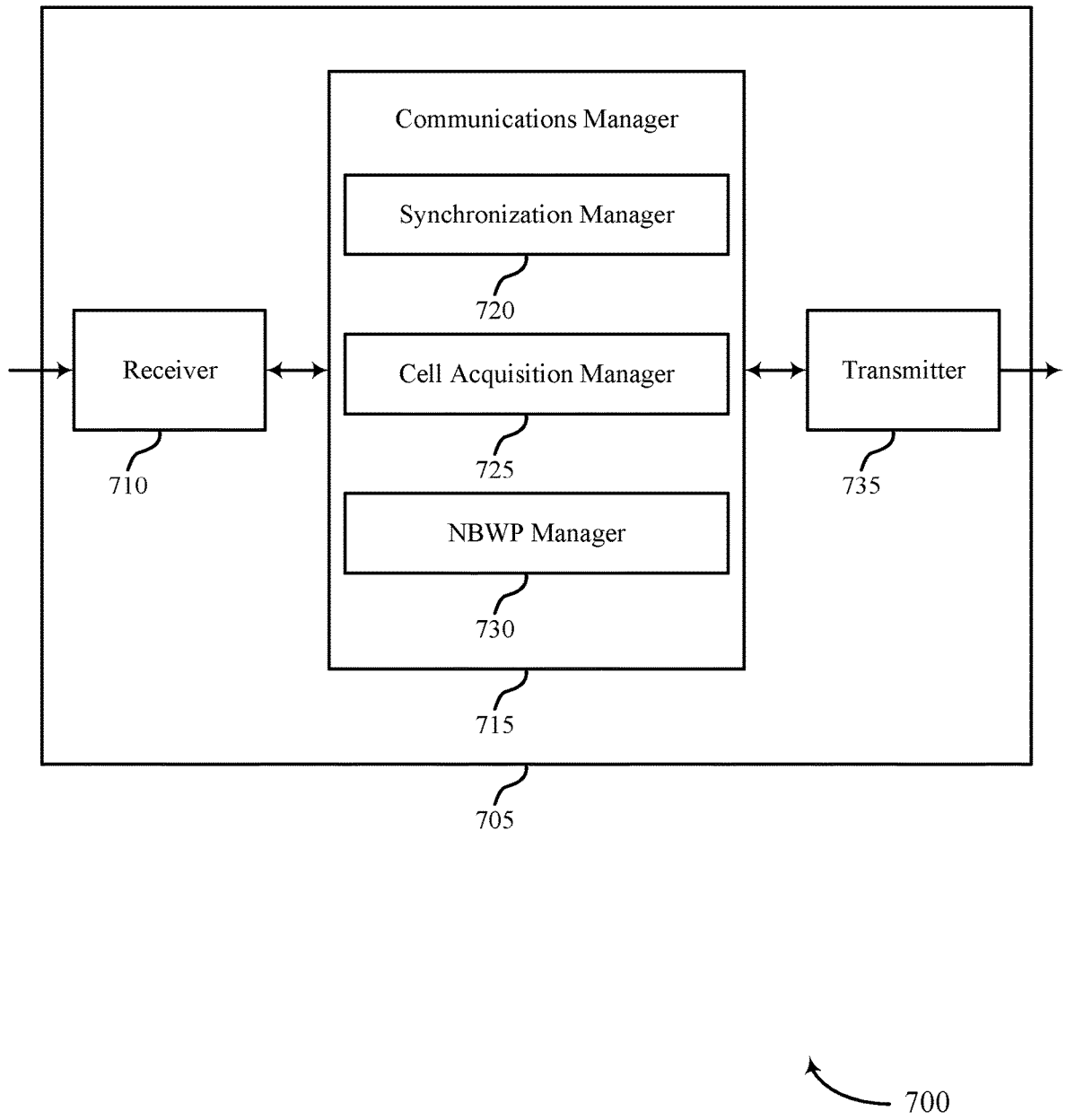

FIG. 7 shows a block diagram 700 of a device 705 that supports NBWP transitions for reduced capability devices in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to NBWP transitions for reduced capability devices). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a synchronization manager 720, a cell acquisition manager 725, and a NBWP manager 730. The communications manager 715 may be an example of aspects of the communications manager 910 described herein.

The synchronization manager 720 may receive a synchronization signal by monitoring a first set of physical resource blocks. The cell acquisition manager 725 may perform cell acquisition based on the received synchronization signal. The NBWP manager 730 may transition from monitoring the first set of physical resource blocks to monitoring a first subset of physical resource blocks based on the cell acquisition, where the first subset of physical resource blocks is associated with less bandwidth than the first set of physical resource blocks and communicate with a base station based on data received via the first subset of physical resource blocks.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
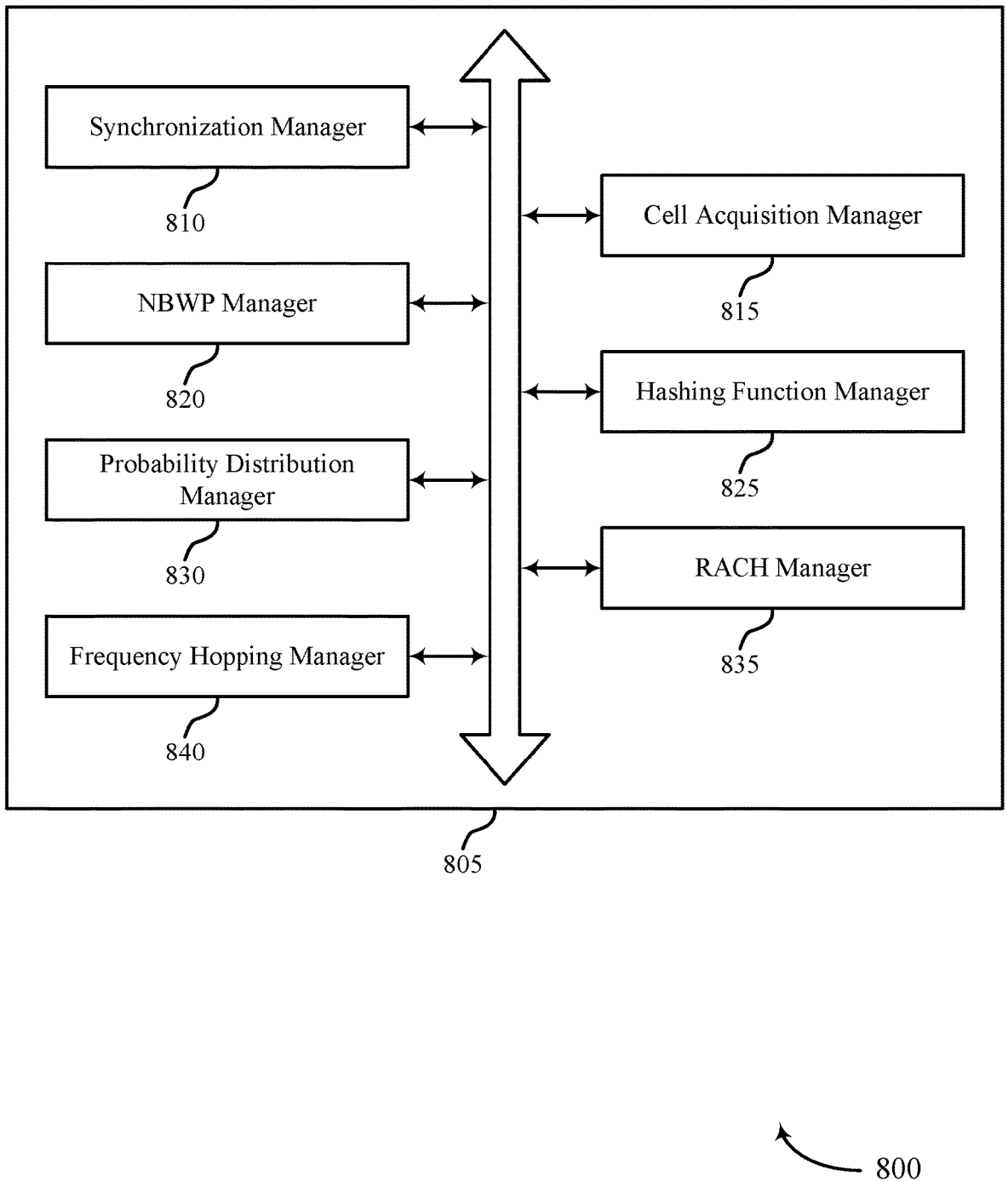
FIG. 8 shows a block diagram of a communications manager that supports NBWP transitions for reduced capability devices in accordance with aspects of the present disclosure.

FIG. 8 shows a block diagram 800 of a communications manager 805 that supports NBWP transitions for reduced capability devices in accordance with aspects of the present disclosure. The communications manager 805 may be an example of aspects of a communications manager 615, a communications manager 715, or a communications manager 910 described herein. The communications manager 805 may include a synchronization manager 810, a cell acquisition manager 815, a NBWP manager 820, a hashing function manager 825, a probability distribution manager 830, a RACH manager 835, and a frequency hopping manager 840. Each of these modules may communicate, directly or indirectly, with one another (e.g., via one or more buses).

The synchronization manager 810 may receive a synchronization signal by monitoring a first set of physical resource blocks. The cell acquisition manager 815 may perform cell acquisition based on the received synchronization signal. In some examples, the cell acquisition manager 815 may decode one or more SIBs, where the transitioning to monitoring the first subset of physical resource blocks is based on the decoding of the one or more SIBs. In some examples, the cell acquisition manager 815 may transition to an RRC connected mode or an RRC idle mode based on the performed cell acquisition, where the transitioning to monitoring the first subset of physical resource blocks is based on the RRC connected mode or the RRC idle mode.

The NBWP manager 820 may transition from monitoring the first set of physical resource blocks to monitoring a first subset of physical resource blocks based on the cell acquisition, where the first subset of physical resource blocks is associated with less bandwidth than the first set of physical resource blocks. In some examples, the NBWP manager 820 may communicate with a base station based on data received via the first subset of physical resource blocks. In some examples, the NBWP manager 820 may identify one or more subsets of physical resource blocks based on the cell acquisition. In some examples, the NBWP manager 820 may select the first subset of physical resource blocks from the one or more subsets of physical resource blocks, where the transitioning to monitoring the first subset of physical resource blocks is based on the selection.

In some examples, the NBWP manager 820 may receive an indication a frequency location for each of the one or more subsets of physical resource blocks in one or more of a SIB or dedicated RRC signaling. In some examples, the NBWP manager 820 may receive an indication of the first subset of physical resource blocks from the base station, where the transitioning to monitoring the first subset of physical resource blocks is based on the received indication. In some examples, the NBWP manager 820 may transition from monitoring the first subset of physical resource blocks to monitoring a second subset of physical resource blocks. In some examples, the NBWP manager 820 may receive an indication of the second subset of physical resource blocks from the base station, where the transitioning to monitoring the second subset of physical resource blocks is based on the received indication.

In some examples, the NBWP manager 820 may receive a grant for wireless communications resources from the base station, where the grant includes the indication of the second subset of physical resource blocks. In some examples, the NBWP manager 820 may identify an active time interval associated with the first subset of physical resource blocks, where the transitioning to monitoring the second subset of physical resource blocks is based on expiration of the active time interval. In some cases, the indication includes one or more of an index associated with the first subset of physical resource blocks or a center frequency associated with the first subset of physical resource blocks and a bandwidth associated with the first subset of physical resource blocks. In some cases, the indication is received via RRC signaling, DCI, or a MAC CE. In some cases, the indication includes a group index corresponding to a group of the UE.

The hashing function manager 825 may identify a hashing function between an index associated with the first subset of physical resource blocks and one or more of an IMSI of the UE or a RNTI of the UE, where the first subset of physical resource blocks is selected based on the identified hashing function. In some examples, the hashing function manager 825 may receive an indication of the hashing function from the base station, where the hashing function is identified based on the received indication.

The probability distribution manager 830 may identify a probability distribution, where the first subset of physical resource blocks is randomly selected from the one or more subsets of physical resource blocks based on the probability distribution. In some examples, the probability distribution manager 830 may receive an indication of the probability distribution, where the probability distribution is identified based on the received indication. In some examples, the probability distribution manager 830 may identify a probability distribution based on expiration of the active time interval. In some examples, the probability distribution manager 830 may select the second subset of physical resource blocks randomly based on the probability distribution, where the transitioning to monitoring the second subset of physical resource blocks is based on the selected second subset of physical resource blocks.

The RACH manager 835 may perform a RACH procedure with the base station based on the performed cell acquisition, where the transitioning to monitoring the first subset of physical resource blocks is based on the performed RACH procedure. In some examples, the RACH manager 835 may perform a RACH procedure with the base station based on the transitioning to monitoring the first subset of physical resource blocks.

The frequency hopping manager 840 may identify a frequency hopping configuration where the transitioning to monitoring the second subset of physical resource blocks is based on the frequency hopping configuration. In some examples, the frequency hopping manager 840 may receive an indication of the frequency hopping configuration from the base station, where the frequency hopping configuration is identified based on the received indication.

Figure 9:
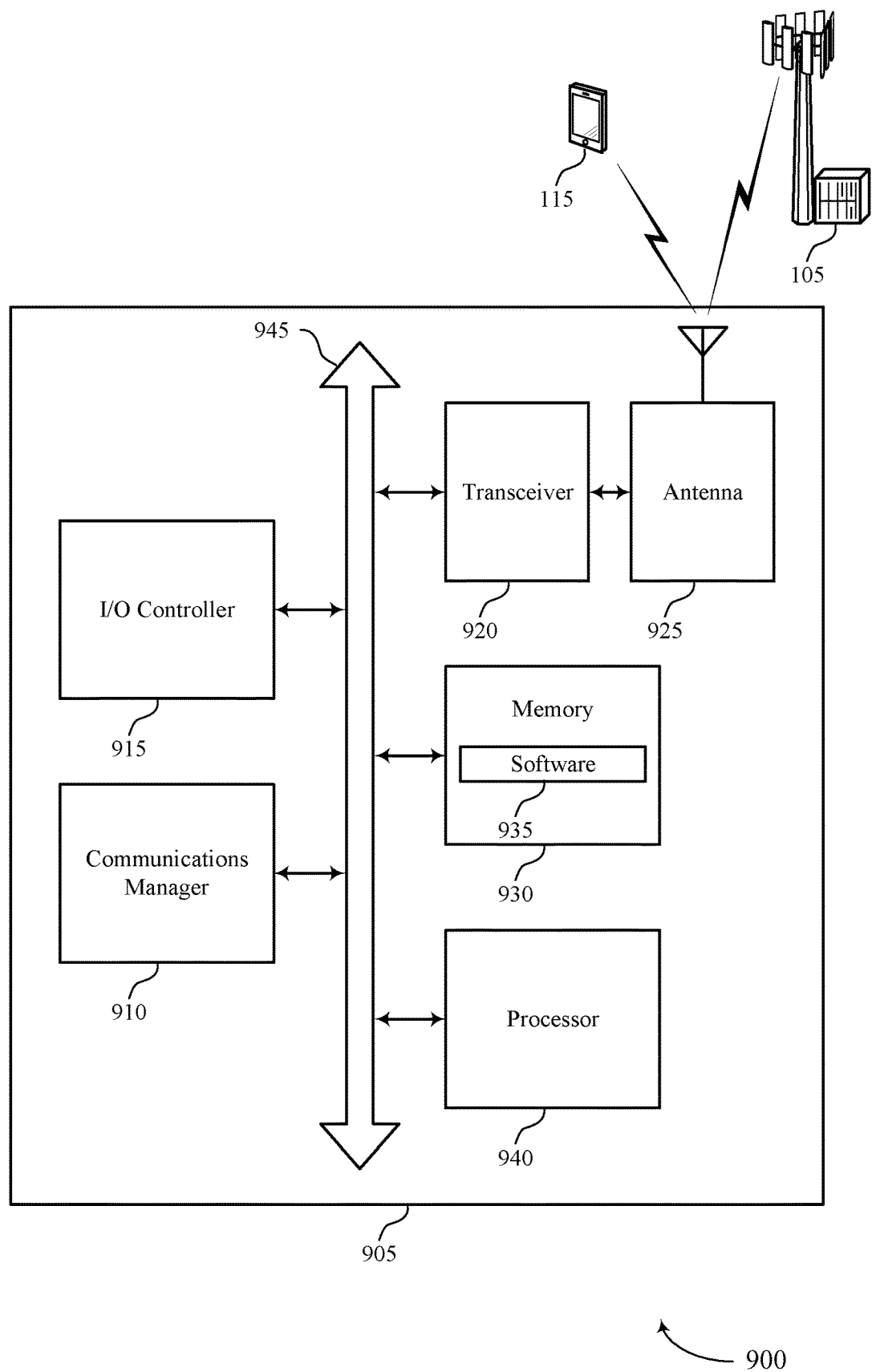
FIG. 9 shows a diagram of a system including a device that supports NBWP transitions for reduced capability devices in accordance with aspects of the present disclosure.

FIG. 9 shows a diagram of a system 900 including a device 905 that supports NBWP transitions for reduced capability devices in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a synchronization signal by monitoring a first set of physical resource blocks, perform cell acquisition based on the received synchronization signal, transition from monitoring the first set of physical resource blocks to monitoring a first subset of physical resource blocks based on the cell acquisition, where the first subset of physical resource blocks is associated with less bandwidth than the first set of physical resource blocks, and communicate with a base station based on data received via the first subset of physical resource blocks.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code or software 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting NBWP transitions for reduced capability devices).

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
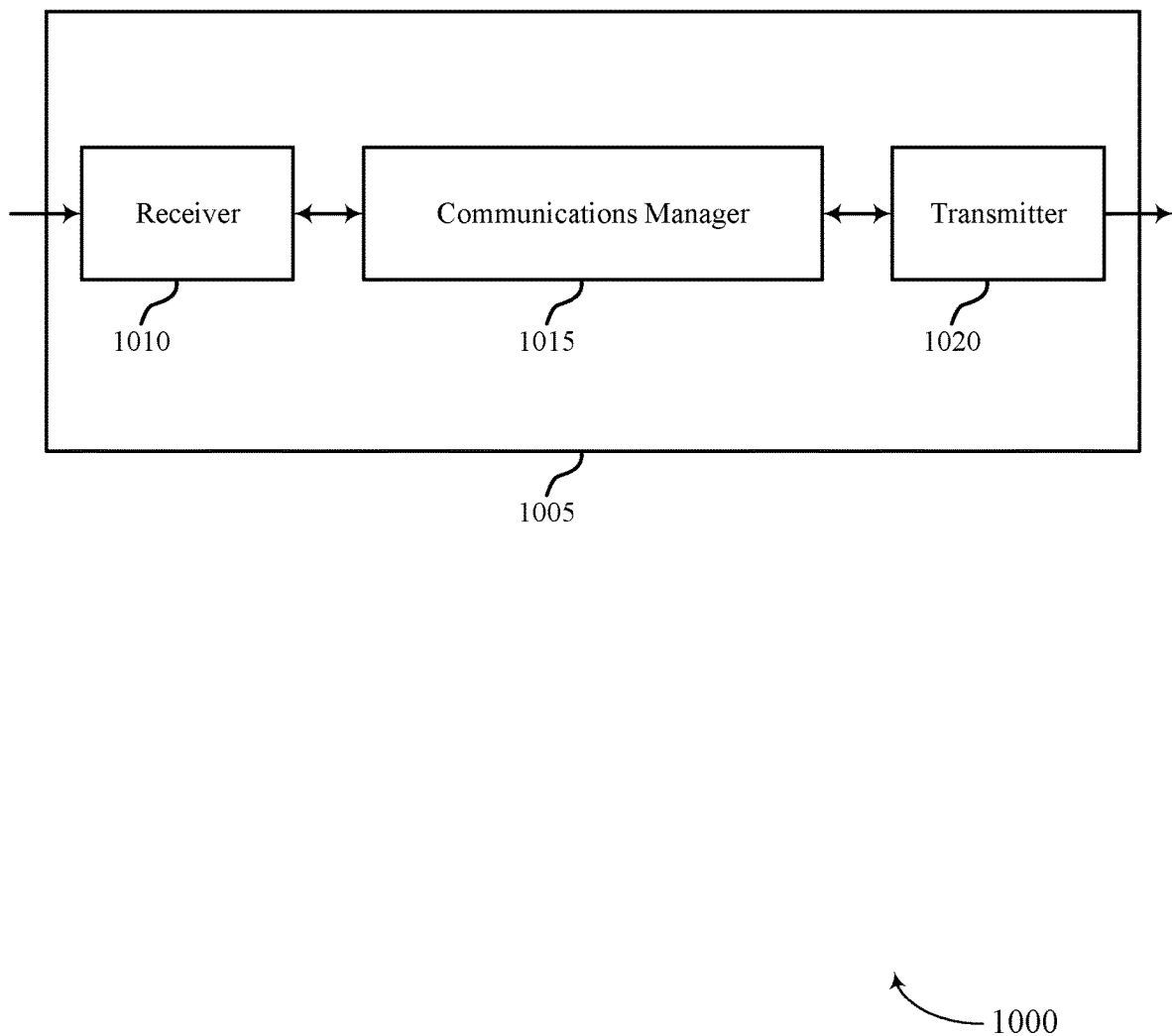
FIGS. 10 and 11 show block diagrams of devices that support NBWP transitions for reduced capability devices in accordance with aspects of the present disclosure.

FIG. 10 shows a block diagram 1000 of a device 1005 that supports NBWP transitions for reduced capability devices in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to NBWP transitions for reduced capability devices). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify an initial transition of a UE from monitoring a first set of physical resource blocks to monitoring a first subset of physical resource blocks, transmit signaling to transition the UE from monitoring the first subset of physical resource blocks to monitoring a second subset of physical resource blocks, communicate with the UE based on the first subset of physical resource blocks, where the first subset of physical resource blocks is associated with less bandwidth than the first set of physical resource blocks, and communicate with the UE based on data transmitted via the second subset of physical resource blocks. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
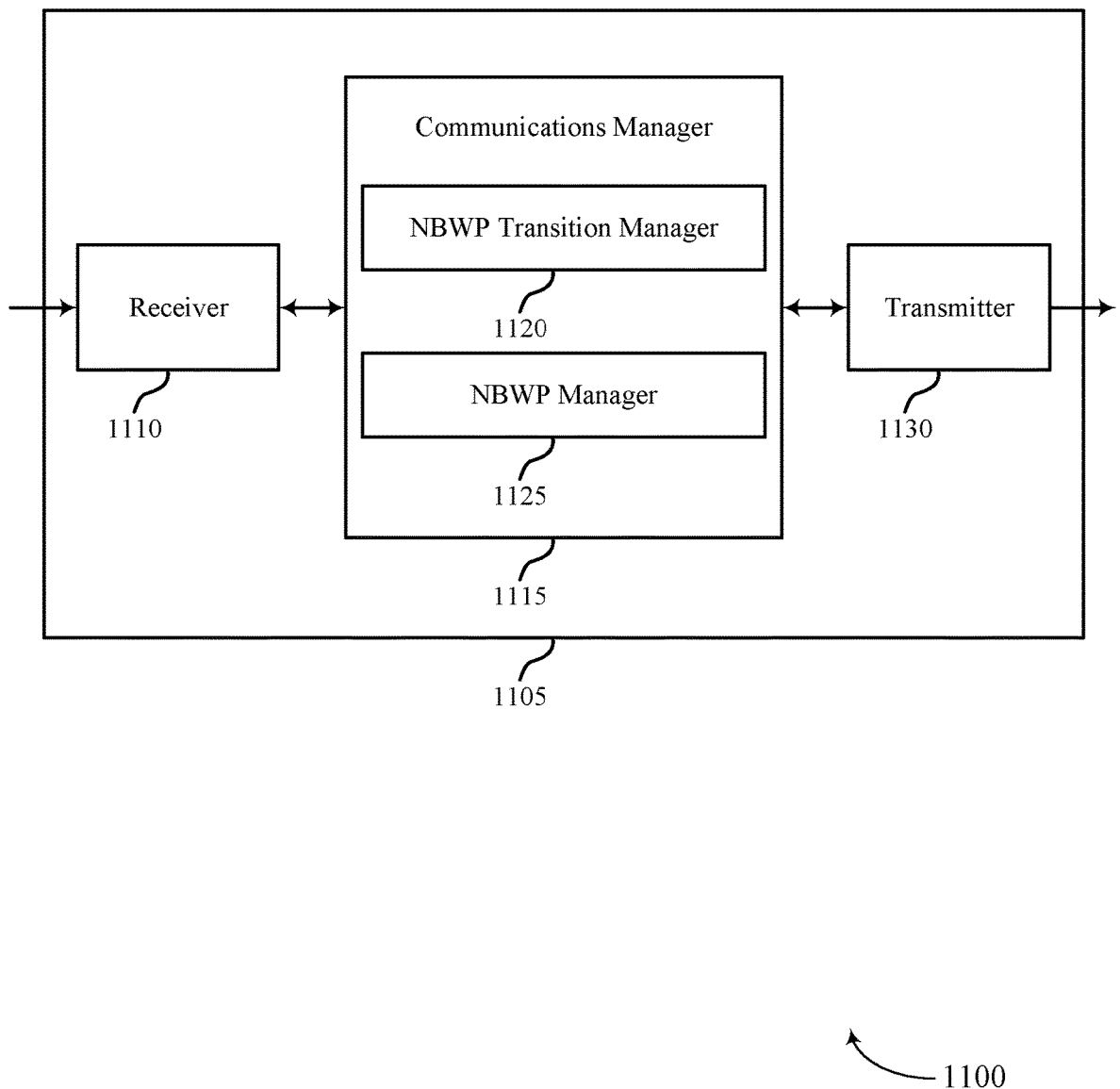

FIG. 11 shows a block diagram 1100 of a device 1105 that supports NBWP transitions for reduced capability devices in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to NBWP transitions for reduced capability devices). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a NBWP transition manager 1120 and a NBWP manager 1125. The communications manager 1115 may be an example of aspects of the communications manager 1310 described herein.

The NBWP transition manager 1120 may identify an initial transition of a UE from monitoring a first set of physical resource blocks to monitoring a first subset of physical resource blocks. The NBWP manager 1125 may communicate with the UE based on the first subset of physical resource blocks, where the first subset of physical resource blocks is associated with less bandwidth than the first set of physical resource blocks. The NBWP transition manager 1120 may transmit signaling to transition the UE from monitoring the first subset of physical resource blocks to monitoring a second subset of physical resource blocks. The NBWP manager 1125 may communicate with the UE based on data transmitted via the second subset of physical resource blocks.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
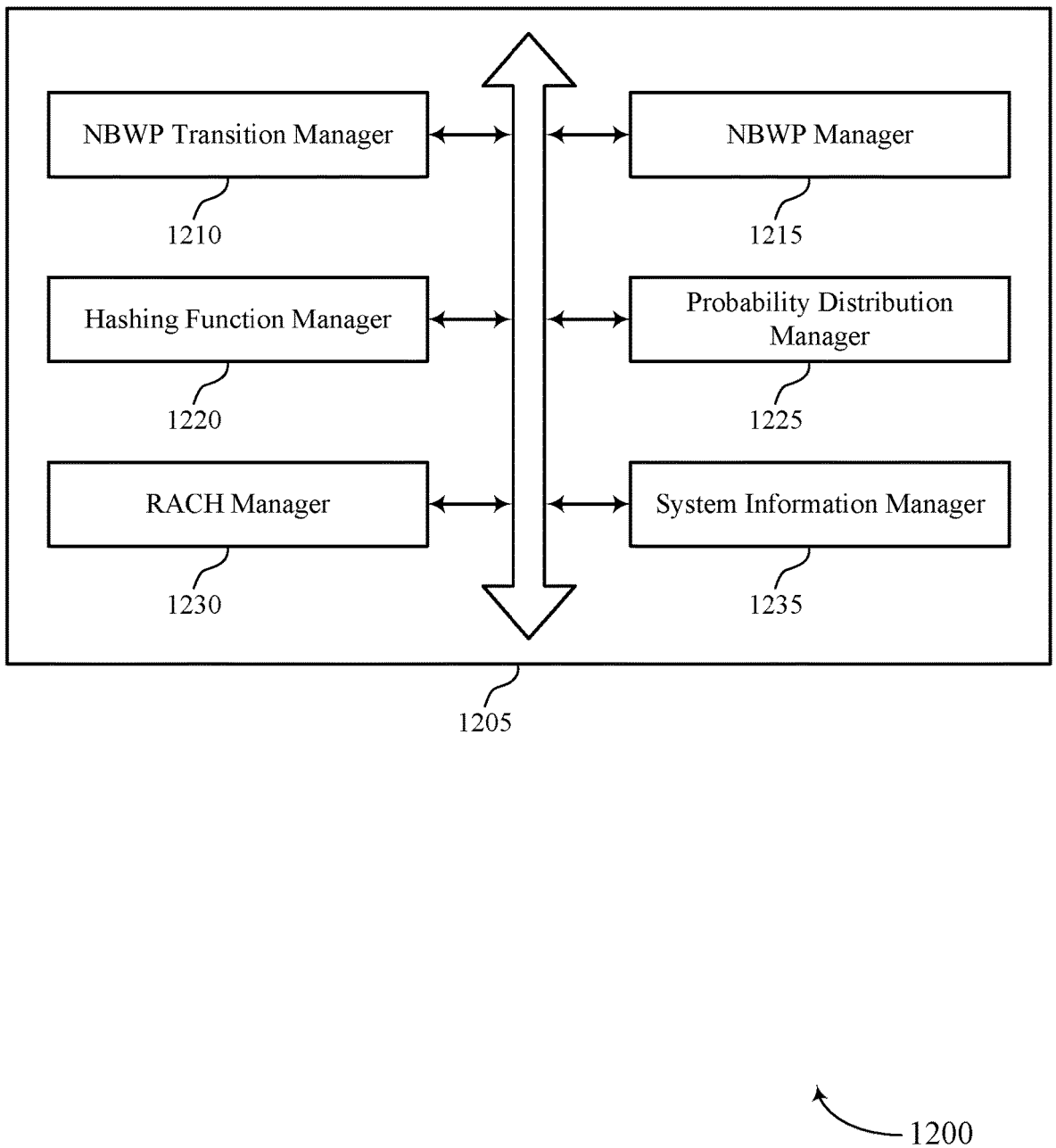
FIG. 12 shows a block diagram of a communications manager that supports NBWP transitions for reduced capability devices in accordance with aspects of the present disclosure.

FIG. 12 shows a block diagram 1200 of a communications manager 1205 that supports NBWP transitions for reduced capability devices in accordance with aspects of the present disclosure. The communications manager 1205 may be an example of aspects of a communications manager 1015, a communications manager 1115, or a communications manager 1310 described herein. The communications manager 1205 may include a NBWP transition manager 1210, a NBWP manager 1215, a hashing function manager 1220, a probability distribution manager 1225, a RACH manager 1230, and a system information manager 1235. Each of these modules may communicate, directly or indirectly, with one another (e.g., via one or more buses).

The NBWP transition manager 1210 may identify an initial transition of a UE from monitoring a first set of physical resource blocks to monitoring a first subset of physical resource blocks. In some examples, the NBWP transition manager 1210 may transmit signaling to transition the UE from monitoring the first subset of physical resource blocks to monitoring a second subset of physical resource blocks. In some examples, identifying a default initial subset of physical resource blocks, where the first subset of physical resource blocks includes the identified default initial subset of physical resource blocks. In some examples, the NBWP transition manager 1210 may identify the first subset of physical resource blocks based on one or more of the probability distribution or the hashing function, where the initial transition is identified based on the identified first subset of physical resource blocks.

In some examples, the NBWP transition manager 1210 may transmit an indication of the first subset of physical resource blocks, where the initial transition of the UE from monitoring the first set of physical resource blocks to monitoring the first subset of physical resource blocks is identified based on the transmitted indication. In some cases, the signaling to transition the UE includes an indication of the second subset of physical resource blocks. In some cases, the indication includes one or more of an index associated with the first subset of physical resource blocks or a center frequency associated with the first subset of physical resource blocks and a bandwidth associated with the first subset of physical resource blocks. In some cases, the indication is transmitted via RRC signaling, DCI, or a MAC CE. In some cases, the indication includes a group index corresponding to a group of the UE. In some cases, the signaling to transition the UE includes a grant including an indication of the second subset of physical resource blocks. In some cases, the signaling to transition the UE includes a frequency hopping configuration.

The NBWP manager 1215 may communicate with the UE based on the first subset of physical resource blocks, where the first subset of physical resource blocks is associated with less bandwidth than the first set of physical resource blocks. In some examples, the NBWP manager 1215 may communicate with the UE based on data transmitted via the second subset of physical resource blocks. In some examples, the NBWP manager 1215 may transmit an indication of a frequency location for each of one or more subsets of physical resource blocks in one or more of a SIB or dedicated RRC signaling, where the signaling to transition the UE from monitoring the first subset of physical resource blocks to the second subset of physical resource blocks is transmitted based on the transmitted indication.

The hashing function manager 1220 may identify a hashing function between indices associated with one or more subsets of physical resource blocks and one or more of an IMSI of the UE or a RNTI of the UE, where the signaling to transition the UE includes the hashing function.

The probability distribution manager 1225 may identify a probability distribution for UE random selection between one or more subsets of physical resource blocks, where the signaling to transition the UE includes the probability distribution. In some examples, the probability distribution manager 1225 may identify one or more of a probability distribution for UE random selection or a hashing function for UE selection.

The RACH manager 1230 may perform a RACH procedure with the UE, where the initial transition of the UE is identified based on the performed RACH procedure. In some examples, the RACH manager 1230 may perform a RACH procedure with the UE based on the identified initial transition of the UE.

The system information manager 1235 may transmit one or more SIBs, where the initial transition of the UE is identified based on the one or more transmitted SIBs.

Figure 13:
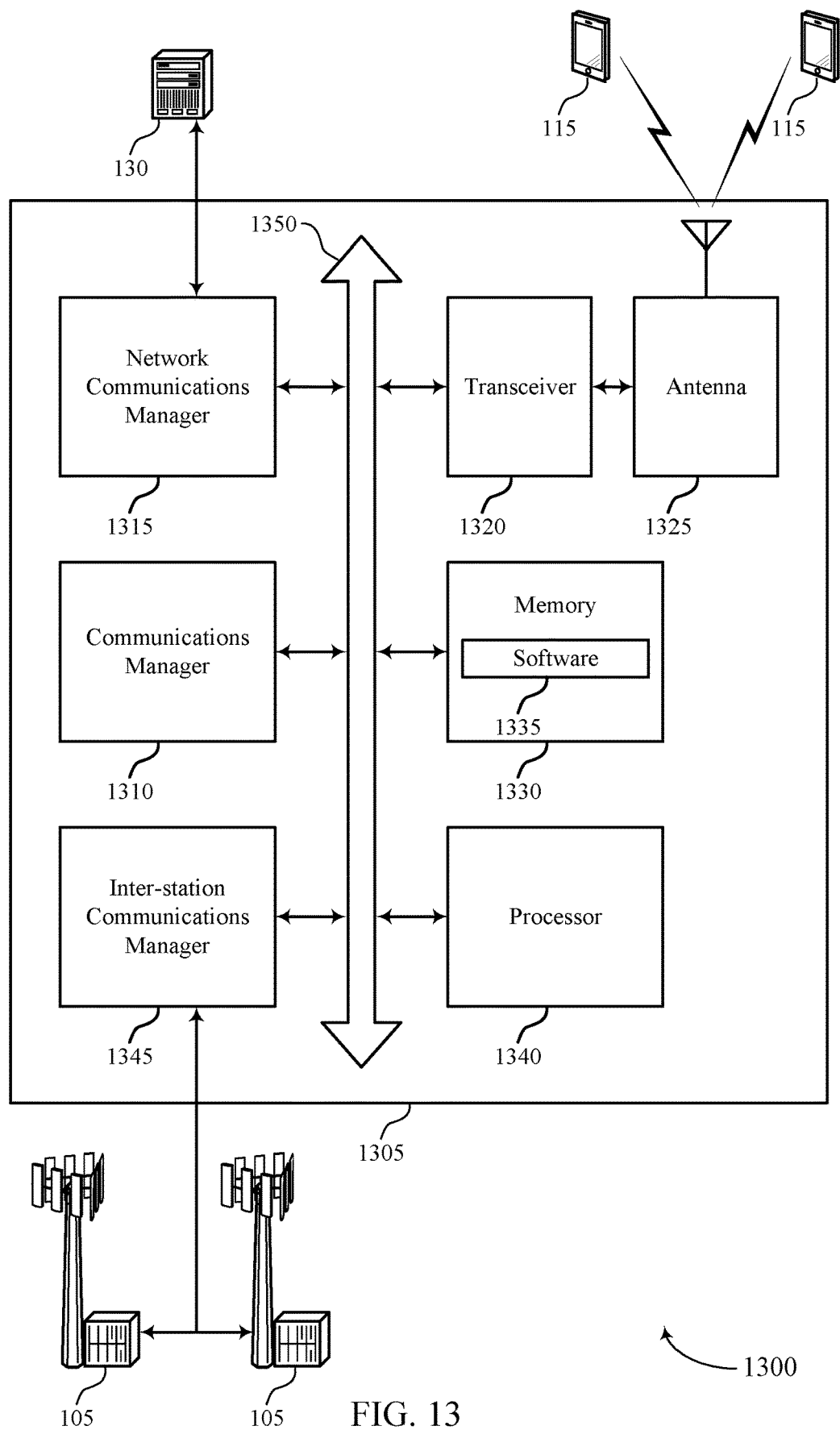
FIG. 13 shows a diagram of a system including a device that supports NBWP transitions for reduced capability devices in accordance with aspects of the present disclosure.

FIG. 13 shows a diagram of a system 1300 including a device 1305 that supports NBWP transitions for reduced capability devices in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify an initial transition of a UE from monitoring a first set of physical resource blocks to monitoring a first subset of physical resource blocks, transmit signaling to transition the UE from monitoring the first subset of physical resource blocks to monitoring a second subset of physical resource blocks, communicate with the UE based on the first subset of physical resource blocks, where the first subset of physical resource blocks is associated with less bandwidth than the first set of physical resource blocks, and communicate with the UE based on data transmitted via the second subset of physical resource blocks.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting NBWP transitions for reduced capability devices).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
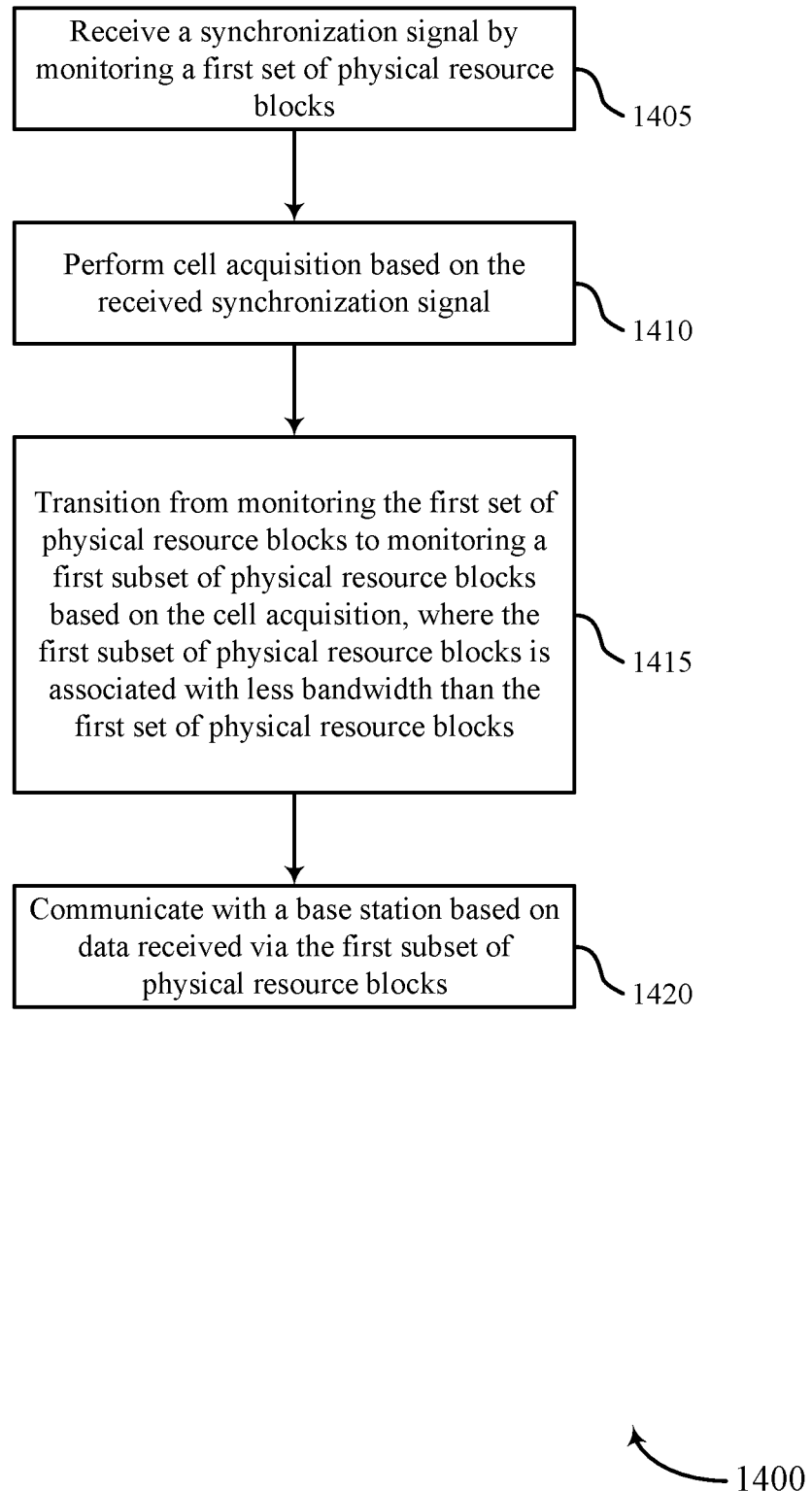
FIGS. 14 through 17 show flowcharts illustrating methods that support NBWP transitions for reduced capability devices in accordance with aspects of the present disclosure.

FIG. 14 shows a flowchart illustrating a method 1400 that supports NBWP transitions for reduced capability devices in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a synchronization signal (e.g., a PSS or an SSB) by monitoring a first set of physical resource blocks (e.g., a first BWP). The operations of 1405 may be performed according to the methods described herein. In some examples, aspects of the operations of 1405 may be performed by a synchronization manager as described with reference to FIGS. 6 through 9.

At 1410, the UE may perform cell acquisition (e.g., detection of the cell, beam selection, SIB1 decoding, or some combination) based on the received synchronization signal. The operations of 1410 may be performed according to the methods described herein. In some examples, aspects of the operations of 1410 may be performed by a cell acquisition manager as described with reference to FIGS. 6 through 9.

At 1415, the UE may transition from monitoring the first set of physical resource blocks to monitoring a first subset of physical resource blocks (e.g., a first NBWP, which in some cases may be referred to as an initial NBWP) based on the cell acquisition, where the first subset of physical resource blocks is associated with less bandwidth than the first set of physical resource blocks. The operations of 1415 may be performed according to the methods described herein. In some examples, aspects of the operations of 1415 may be performed by a NBWP manager as described with reference to FIGS. 6 through 9.

At 1420, the UE may communicate with a base station based on data received via the first subset of physical resource blocks. The operations of 1420 may be performed according to the methods described herein. In some examples, aspects of the operations of 1420 may be performed by a NBWP manager as described with reference to FIGS. 6 through 9.

Figure 15:
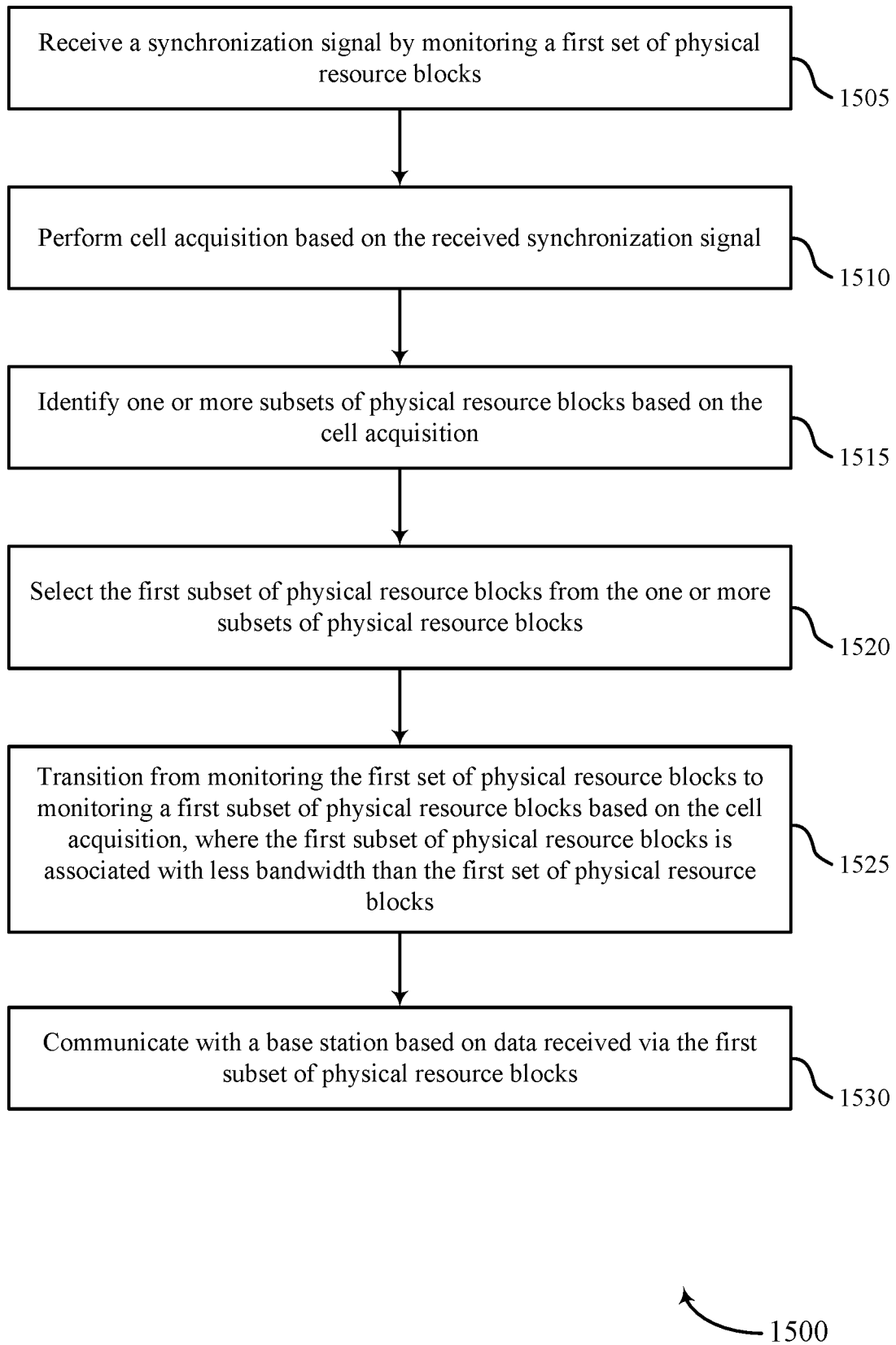

FIG. 15 shows a flowchart illustrating a method 1500 that supports NBWP transitions for reduced capability devices in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a synchronization signal by monitoring a first set of physical resource blocks. The operations of 1505 may be performed according to the methods described herein. In some examples, aspects of the operations of 1505 may be performed by a synchronization manager as described with reference to FIGS. 6 through 9.

At 1510, the UE may perform cell acquisition based on the received synchronization signal. The operations of 1510 may be performed according to the methods described herein. In some examples, aspects of the operations of 1510 may be performed by a cell acquisition manager as described with reference to FIGS. 6 through 9.

At 1515, the UE may identify one or more subsets of physical resource blocks based on the cell acquisition. The operations of 1515 may be performed according to the methods described herein. In some examples, aspects of the operations of 1515 may be performed by a NBWP manager as described with reference to FIGS. 6 through 9.

At 1520, the UE may select the first subset of physical resource blocks from the one or more subsets of physical resource blocks. For example, in some cases the first subset of physical resource blocks may be selected based on a default subset of physical resource blocks for initial UE transition to a NBWP. Alternatively, the UE may receive signaling indicating the first subset of physical resource blocks (e.g., via a NBWP index from a base station), and the UE may select the first subset of physical resource blocks accordingly. In yet other examples, the UE may identify the one or more subsets of physical resource blocks at 1515, and the UE may select the first subset of physical resource blocks from the one or more subsets based on a configured or indicated (e.g., from the base station) hashing function of the UE. In some examples, the UE may select the first subset of physical resource blocks randomly based on some configured or indicated (e.g., from the base station) probability distribution. The operations of 1520 may be performed according to the methods described herein. In some examples, aspects of the operations of 1520 may be performed by a NBWP manager as described with reference to FIGS. 6 through 9.

At 1525, the UE may transition from monitoring the first set of physical resource blocks to monitoring the selected first subset of physical resource blocks (e.g., where the first subset of physical resource blocks is associated with less bandwidth than the first set of physical resource blocks). The operations of 1525 may be performed according to the methods described herein. In some examples, aspects of the operations of 1525 may be performed by a NBWP manager as described with reference to FIGS. 6 through 9.

At 1530, the UE may communicate with a base station based on data received via the first subset of physical resource blocks. The operations of 1530 may be performed according to the methods described herein. In some examples, aspects of the operations of 1530 may be performed by a NBWP manager as described with reference to FIGS. 6 through 9.

Figure 16:
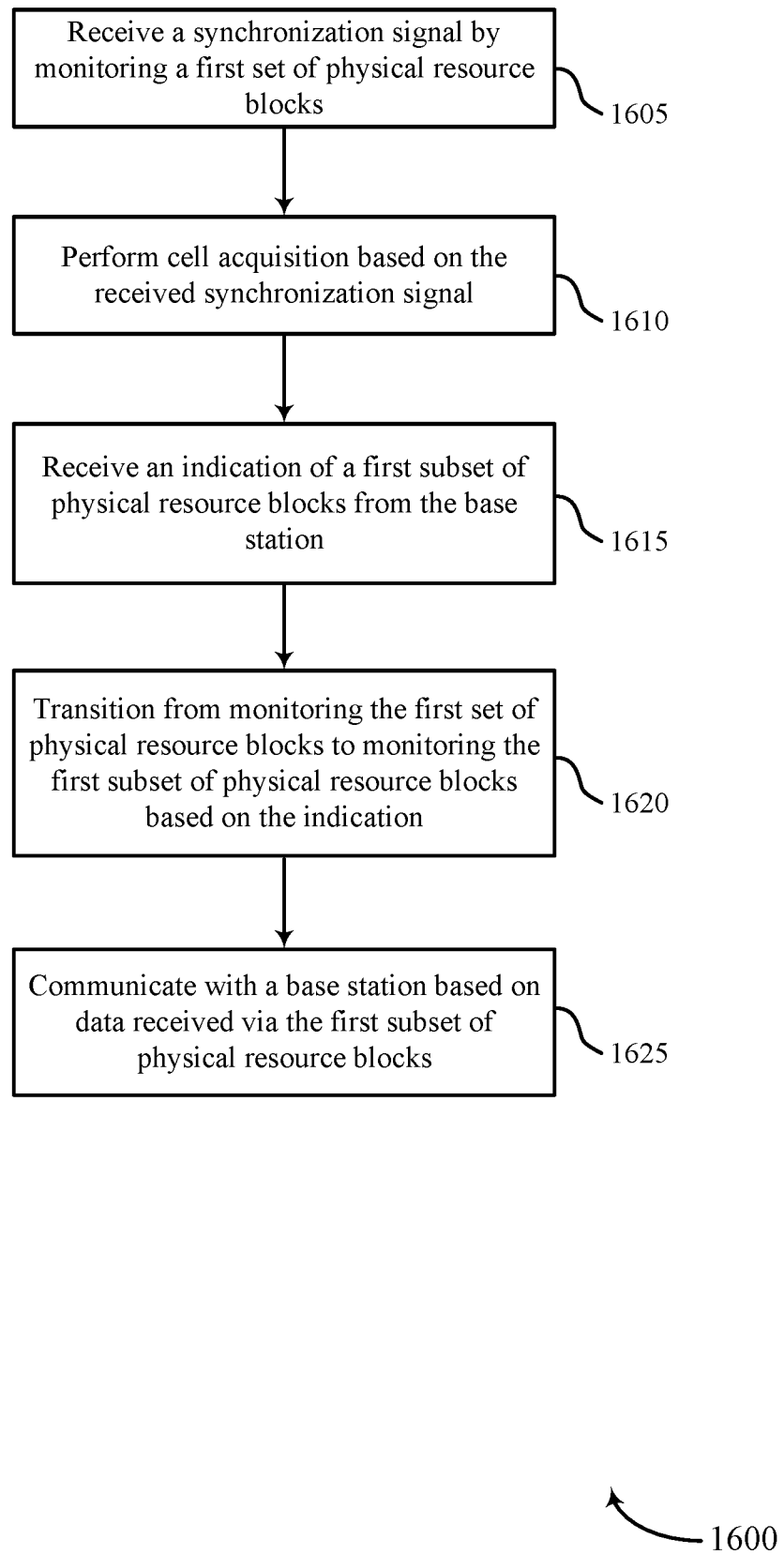

FIG. 16 shows a flowchart illustrating a method 1600 that supports NBWP transitions for reduced capability devices in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a synchronization signal by monitoring a first set of physical resource blocks. The operations of 1605 may be performed according to the methods described herein. In some examples, aspects of the operations of 1605 may be performed by a synchronization manager as described with reference to FIGS. 6 through 9.

At 1610, the UE may perform cell acquisition based on the received synchronization signal. The operations of 1610 may be performed according to the methods described herein. In some examples, aspects of the operations of 1610 may be performed by a cell acquisition manager as described with reference to FIGS. 6 through 9.

At 1615, the UE may receive an indication of a first subset of physical resource blocks from the base station. For example, in some cases, the UE may read a SIB based at least in part on performing the cell acquisition (e.g., based on reading an SSB), and the SIB may include an indication of the first subset of physical resource blocks. In some cases, the UE may receive an indication of the first subset of physical resource blocks via RRC signaling. In some examples, the indication may include an indication of a NBWP index, a center frequency and bandwidth associated with the first subset of physical resource blocks, a hashing function the UE may use to identify the first subset of physical resource blocks, a probability distribution the UE may use to randomly select first subset of physical resource blocks, etc. The operations of 1615 may be performed according to the methods described herein. In some examples, aspects of the operations of 1615 may be performed by a NBWP manager as described with reference to FIGS. 6 through 9.

At 1620, the UE may transition from monitoring the first set of physical resource blocks to monitoring the first subset of physical resource blocks based on the indication received at 1615 (e.g., where the first subset of physical resource blocks is associated with less bandwidth than the first set of physical resource blocks). The operations of 1620 may be performed according to the methods described herein. In some examples, aspects of the operations of 1620 may be performed by a NBWP manager as described with reference to FIGS. 6 through 9.

At 1625, the UE may communicate with a base station based on data received via the first subset of physical resource blocks. The operations of 1625 may be performed according to the methods described herein. In some examples, aspects of the operations of 1625 may be performed by a NBWP manager as described with reference to FIGS. 6 through 9.

Figure 17:
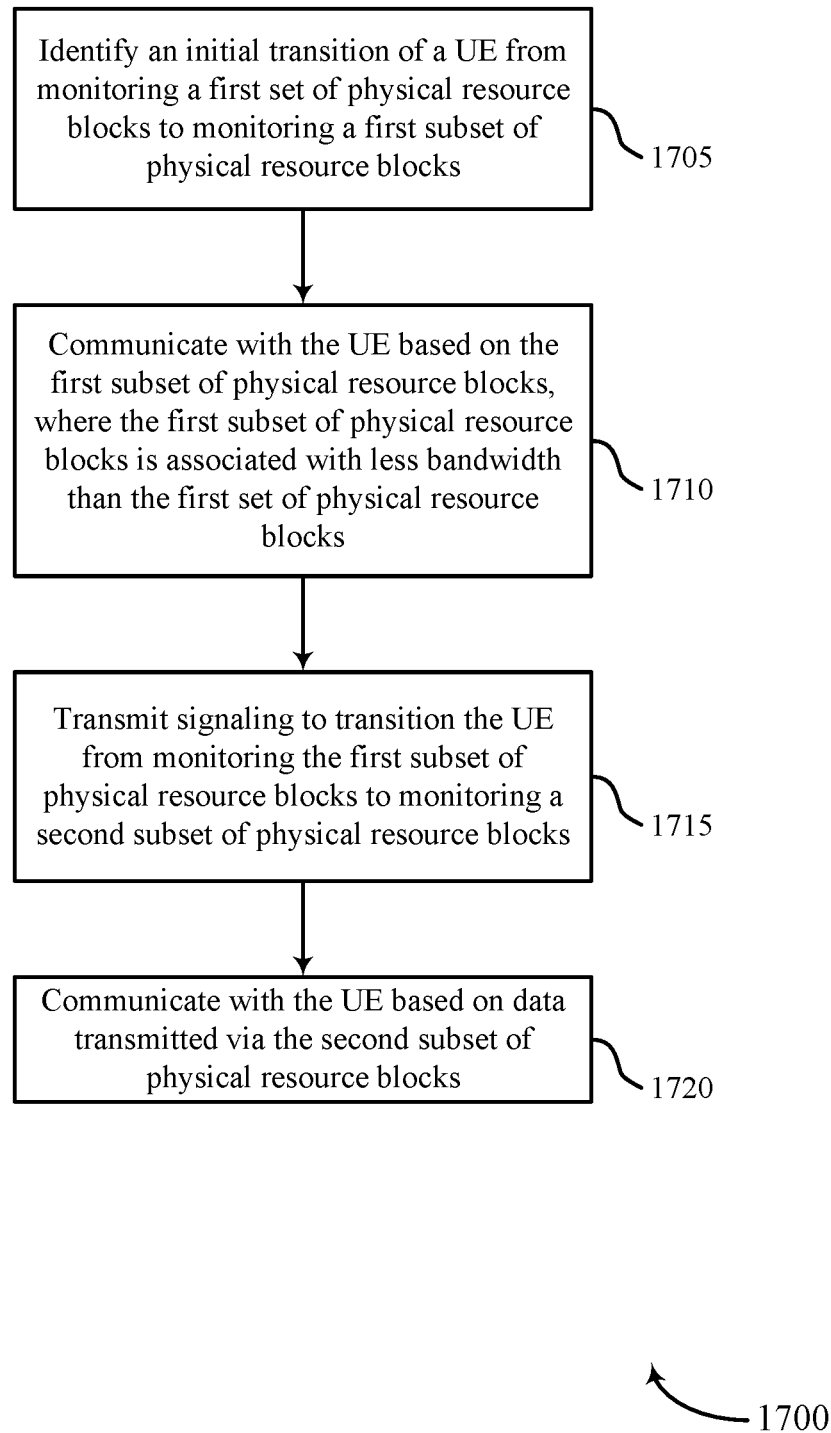

FIG. 17 shows a flowchart illustrating a method 1700 that supports NBWP transitions for reduced capability devices in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify an initial transition of a UE from monitoring a first set of physical resource blocks (e.g., a BWP) to monitoring a first subset of physical resource blocks (e.g., a NBWP). The operations of 1705 may be performed according to the methods described herein. In some examples, aspects of the operations of 1705 may be performed by a NBWP transition manager as described with reference to FIGS. 10 through 13.

At 1710, the base station may communicate with the UE based on the first subset of physical resource blocks, where the first subset of physical resource blocks is associated with less bandwidth than the first set of physical resource blocks. The operations of 1710 may be performed according to the methods described herein. In some examples, aspects of the operations of 1710 may be performed by a NBWP manager as described with reference to FIGS. 10 through 13.

At 1715, the base station may transmit signaling to transition the UE from monitoring the first subset of physical resource blocks to monitoring a second subset of physical resource blocks. As discussed herein, the signaling may include an indication of a NBWP index corresponding to the first subset of physical resource blocks, a center frequency and bandwidth associated with the first subset of physical resource blocks, a hashing function the UE may use to identify the first subset of physical resource blocks, a probability distribution the UE may use to randomly select first subset of physical resource blocks, etc. The operations of 1715 may be performed according to the methods described herein. In some examples, aspects of the operations of 1715 may be performed by a NBWP transition manager as described with reference to FIGS. 10 through 13.

At 1720, the base station may communicate with the UE based on data transmitted via the second subset of physical resource blocks. The operations of 1720 may be performed according to the methods described herein. In some examples, aspects of the operations of 1720 may be performed by a NBWP manager as described with reference to FIGS. 10 through 13.

The Following Provides an Overview of Aspects of the Present Disclosure:

Aspect 1: A method for wireless communication at a UE, comprising: receiving a synchronization signal by monitoring a first set of physical resource blocks; performing cell acquisition based at least in part on the received synchronization signal; transitioning from monitoring the first set of physical resource blocks to monitoring a first subset of physical resource blocks based at least in part on the cell acquisition, wherein the first subset of physical resource blocks is associated with less bandwidth than the first set of physical resource blocks; and communicating with a base station based at least in part on data received via the first subset of physical resource blocks.

Aspect 2: The method of aspect 1, further comprising: identifying one or more subsets of physical resource blocks based at least in part on the cell acquisition; and selecting the first subset of physical resource blocks from the one or more subsets of physical resource blocks, wherein the transitioning to monitoring the first subset of physical resource blocks is based at least in part on the selection.

Aspect 3: The method of aspect 2, further comprising: identifying a hashing function between an index associated with the first subset of physical resource blocks and one or more of an IMSI of the UE or a RNTI of the UE, wherein the first subset of physical resource blocks is selected based at least in part on the identified hashing function.

Aspect 4: The method of aspect 3, further comprising: receiving an indication of the hashing function from the base station, wherein the hashing function is identified based at least in part on the received indication.

Aspect 5: The method of any of aspects 2 through 4, further comprising: identifying a probability distribution, wherein the first subset of physical resource blocks is randomly selected from the one or more subsets of physical resource blocks based at least in part on the probability distribution.

Aspect 6: The method of aspect 5, further comprising: receiving an indication of the probability distribution, wherein the probability distribution is identified based at least in part on the received indication.

Aspect 7: The method of any of aspects 2 through 6, wherein identifying the one or more subsets of physical resource blocks based at least in part on the cell acquisition comprises: receiving an indication a frequency location for each of the one or more subsets of physical resource blocks in one or more of a SIB or dedicated RRC signaling.

Aspect 8: The method of any of aspects 1 through 7, further comprising: receiving an indication of the first subset of physical resource blocks from the base station, wherein the transitioning to monitoring the first subset of physical resource blocks is based at least in part on the received indication.

Aspect 9: The method of aspect 8, wherein the indication comprises one or more of an index associated with the first subset of physical resource blocks or a center frequency associated with the first subset of physical resource blocks and a bandwidth associated with the first subset of physical resource blocks.

Aspect 10: The method of aspect 8 or 9, wherein the indication is received via RRC signaling, DCI, or a MAC CE.

Aspect 11: The method of any of aspects 1 through 10, further comprising: performing a RACH procedure with the base station based at least in part on the performed cell acquisition, wherein the transitioning to monitoring the first subset of physical resource blocks is based at least in part on the performed RACH procedure.

Aspect 12: The method of any of aspects 1 through 11, wherein performing the cell acquisition based at least in part on the received synchronization signal comprises: decoding one or more SIBs, wherein the transitioning to monitoring the first subset of physical resource blocks is based at least in part on the decoding of the one or more SIBs.

Aspect 13: The method of aspect 12, further comprising: performing a RACH procedure with the base station based at least in part on the transitioning to monitoring the first subset of physical resource blocks.

Aspect 14: The method of any of aspects 1 through 13, further comprising: transitioning to a RRC connected mode or a RRC idle mode based at least in part on the performed cell acquisition, wherein the transitioning to monitoring the first subset of physical resource blocks is based at least in part on the RRC connected mode or the RRC idle mode.

Aspect 15: The method of any of aspects 1 through 14, further comprising: transitioning from monitoring the first subset of physical resource blocks to monitoring a second subset of physical resource blocks.

Aspect 16: The method of aspect 15, further comprising: receiving an indication of the second subset of physical resource blocks from the base station, wherein the transitioning to monitoring the second subset of physical resource blocks is based at least in part on the received indication.

Aspect 17: The method of aspect 16, wherein the indication comprises a group index corresponding to a group of the UE.

Aspect 18: The method of aspect 16, wherein the indication comprises one or more of an index associated with the first subset of physical resource blocks or a center frequency associated with the first subset of physical resource blocks and a bandwidth associated with the first subset of physical resource blocks.

Aspect 19: The method of any of aspects 16 through 18, further comprising: receiving a grant for wireless communications resources from the base station, wherein the grant includes the indication of the second subset of physical resource blocks.

Aspect 20: The method of any of aspects 15 through 19, further comprising: identifying an active time interval associated with the first subset of physical resource blocks, wherein the transitioning to monitoring the second subset of physical resource blocks is based at least in part on expiration of the active time interval.

Aspect 21: The method of aspect 20, further comprising: identifying a probability distribution based at least in part on expiration of the active time interval; and selecting the second subset of physical resource blocks randomly based at least in part on the probability distribution, wherein the transitioning to monitoring the second subset of physical resource blocks is based at least in part on the selected second subset of physical resource blocks.

Aspect 22: The method of any of aspects 15 through 21, further comprising: identifying a frequency hopping configuration wherein the transitioning to monitoring the second subset of physical resource blocks is based at least in part on the frequency hopping configuration.

Aspect 23: The method of aspect 22, further comprising: receiving an indication of the frequency hopping configuration from the base station, wherein the frequency hopping configuration is identified based at least in part on the received indication.

Aspect 24: A method for wireless communications at a base station, comprising: identifying an initial transition of a UE from monitoring a first set of physical resource blocks to monitoring a first subset of physical resource blocks; communicating with the UE based at least in part on the first subset of physical resource blocks, wherein the first subset of physical resource blocks is associated with less bandwidth than the first set of physical resource blocks; transmitting signaling to transition the UE from monitoring the first subset of physical resource blocks to monitoring a second subset of physical resource blocks; and communicating with the UE based at least in part on data transmitted via the second subset of physical resource blocks.

Aspect 25: The method of aspect 24, further comprising: identifying a hashing function between indices associated with one or more subsets of physical resource blocks and one or more of an IMSI of the UE or a RNTI of the UE, wherein the signaling to transition the UE comprises the hashing function.

Aspect 26: The method of any of aspects 24 through 25, further comprising: identifying a probability distribution for UE random selection between one or more subsets of physical resource blocks, wherein the signaling to transition the UE comprises the probability distribution.

Aspect 27: The method of any of aspects 24 through 26, wherein identifying the initial transition of the UE to monitoring the first subset of physical resource blocks comprises: identifying a default initial subset of physical resource blocks, wherein the first subset of physical resource blocks comprises the identified default initial subset of physical resource blocks.

Aspect 28: The method of any of aspects 24 through 27, wherein the signaling to transition the UE comprises an indication of the second subset of physical resource blocks.

Aspect 29: The method of aspect 28, wherein the indication comprises one or more of an index associated with the first subset of physical resource blocks or a center frequency associated with the first subset of physical resource blocks and a bandwidth associated with the first subset of physical resource blocks.

Aspect 30: The method of any of aspects 28 through 29, wherein the indication is transmitted via RRC signaling, DCI, or a MAC CE.

Aspect 31: The method of any of aspects 28 through 30, wherein the indication comprises a group index corresponding to a group of the UE.

Aspect 32: The method of any of aspects 24 through 31, wherein the signaling to transition the UE comprises a grant including an indication of the second subset of physical resource blocks.

Aspect 33: The method of any of aspects 24 through 32, wherein the signaling to transition the UE comprises a frequency hopping configuration.

Aspect 34: The method of any of aspects 24 through 33, further comprising: performing a RACH procedure with the UE, wherein the initial transition of the UE is identified based at least in part on the performed RACH procedure.

Aspect 35: The method of any of aspects 24 through 34, further comprising: transmitting one or more SIBs, wherein the initial transition of the UE is identified based at least in part on the one or more transmitted SIBs.

Aspect 36: The method of any of aspects 24 through 35, further comprising: performing a RACH procedure with the UE based at least in part on the identified initial transition of the UE.

Aspect 37: The method of any of aspects 24 through 36, further comprising: transmitting an indication of a frequency location for each of one or more subsets of physical resource blocks in one or more of a SIB or dedicated RRC signaling, wherein the signaling to transition the UE from monitoring the first subset of physical resource blocks to the second subset of physical resource blocks is transmitted based at least in part on the transmitted indication.

Aspect 38: The method of any of aspects 24 through 37, wherein identifying the initial transition of the UE comprises: identifying one or more of a probability distribution for UE random selection or a hashing function for UE selection; and identifying the first subset of physical resource blocks based at least in part on one or more of the probability distribution or the hashing function, wherein the initial transition is identified based at least in part on the identified first subset of physical resource blocks.

Aspect 39: The method of any of aspects 24 through 38, further comprising: transmitting an indication of the first subset of physical resource blocks, wherein the initial transition of the UE from monitoring the first set of physical resource blocks to monitoring the first subset of physical resource blocks is identified based at least in part on the transmitted indication.

Aspect 40: The method of aspect 39, wherein the indication comprises one or more of an index associated with the first subset of physical resource blocks or a center frequency associated with the first subset of physical resource blocks and a bandwidth associated with the first subset of physical resource blocks.

Aspect 41: An apparatus for wireless communication at a UE, comprising a processor; memory coupled with the processor; and instructions stored in the memory and executable by the processor to cause the apparatus to perform a method of any of aspects 1 through 23.

Aspect 42: An apparatus for wireless communication at a UE, comprising at least one means for performing a method of any of aspects 1 through 23.

Aspect 43: A non-transitory computer-readable medium storing code for wireless communication at a UE, the code comprising instructions executable by a processor to perform a method of any of aspects 1 through 23.

Aspect 44: An apparatus for wireless communications at a base station, comprising a processor; memory coupled with the processor; and instructions stored in the memory and executable by the processor to cause the apparatus to perform a method of any of aspects 24 through 40.

Aspect 45: An apparatus for wireless communications at a base station, comprising at least one means for performing a method of any of aspects 24 through 40.

Aspect 46: A non-transitory computer-readable medium storing code for wireless communications at a base station, the code comprising instructions executable by a processor to perform a method of any of aspects 24 through 40.

It should be noted that the methods described herein describe possible implementations, and that the operations and the steps may be rearranged or otherwise modified and that other implementations are possible. Further, aspects from two or more of the methods may be combined. The following examples are given by way of illustration. Aspects of the following examples may be combined with aspects or embodiments shown or discussed in relation to the figures or elsewhere herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and Global System for Mobile Communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a synchronization signal by monitoring a first set of physical resource blocks, wherein the first set of physical resource blocks is associated with less bandwidth than a channel frequency bandwidth;
   performing cell acquisition based at least in part on the received synchronization signal;
   transitioning from monitoring the first set of physical resource blocks to monitoring a first subset of physical resource blocks based at least in part on the cell acquisition, wherein the first subset of physical resource blocks is associated with a first bandwidth and the first set of physical resource blocks is associated with a second bandwidth, and wherein the first bandwidth is less than the second bandwidth and the first bandwidth is associated with at least a reference signal bandwidth; and
   communicating with a base station based at least in part on data received via the first subset of physical resource blocks.

2. The method of claim 1, further comprising:
   identifying one or more subsets of physical resource blocks based at least in part on the cell acquisition; and
   selecting the first subset of physical resource blocks from the one or more subsets of physical resource blocks, wherein the transitioning to monitoring the first subset of physical resource blocks is based at least in part on the selection.

3. The method of claim 2, further comprising:
   identifying a hashing function between an index associated with the first subset of physical resource blocks and one or more of an international mobile subscriber identity of the UE or a radio network temporary identifier of the UE, wherein the first subset of physical resource blocks is selected based at least in part on the identified hashing function.

4. The method of claim 3, further comprising:
   receiving an indication of the hashing function from the base station, wherein the hashing function is identified based at least in part on the received indication.

5. The method of claim 2, further comprising:
   identifying a probability distribution, wherein the first subset of physical resource blocks is randomly selected from the one or more subsets of physical resource blocks based at least in part on the probability distribution.

6. The method of claim 5, further comprising:
   receiving an indication of the probability distribution, wherein the probability distribution is identified based at least in part on the received indication.

7. The method of claim 2, wherein identifying the one or more subsets of physical resource blocks based at least in part on the cell acquisition comprises:
   receiving an indication a frequency location for each of the one or more subsets of physical resource blocks in one or more of a system information block or dedicated radio resource control signaling.

8. The method of claim 1, further comprising:
   receiving an indication of the first subset of physical resource blocks from the base station, wherein the transitioning to monitoring the first subset of physical resource blocks is based at least in part on the received indication.

9. The method of claim 8, wherein the indication comprises one or more of an index associated with the first subset of physical resource blocks or a center frequency associated with the first subset of physical resource blocks and the first bandwidth.

10. The method of claim 8, wherein the indication is received via radio resource control signaling, downlink control information, or a medium access control control element.

11. The method of claim 1, further comprising:
    performing a random access channel procedure with the base station based at least in part on the performed cell acquisition, wherein the transitioning to monitoring the first subset of physical resource blocks is based at least in part on the performed random access channel procedure.

12. The method of claim 1, wherein performing the cell acquisition based at least in part on the received synchronization signal comprises:
    decoding one or more system information blocks, wherein the transitioning to monitoring the first subset of physical resource blocks is based at least in part on the decoding of the one or more system information blocks.

13. The method of claim 12, further comprising:
performing a random access channel procedure with the base station based at least in part on the transitioning to monitoring the first subset of physical resource blocks.

14. The method of claim 1, further comprising:
transitioning to a radio resource control connected mode or a radio resource control idle mode based at least in part on the performed cell acquisition, wherein the transitioning to monitoring the first subset of physical resource blocks is based at least in part on the radio resource control connected mode or the radio resource control idle mode.

15. The method of claim 1, further comprising:
transitioning from monitoring the first subset of physical resource blocks to monitoring a second subset of physical resource blocks.

16. The method of claim 15, further comprising:
receiving an indication of the second subset of physical resource blocks from the base station, wherein the transitioning to monitoring the second subset of physical resource blocks is based at least in part on the received indication.

17. The method of claim 16, wherein the indication comprises a group index corresponding to a group of the UE.

18. The method of claim 16, wherein the indication comprises one or more of an index associated with the first subset of physical resource blocks or a center frequency associated with the first subset of physical resource blocks and the first bandwidth.

19. The method of claim 16, further comprising:
receiving a grant for wireless communications resources from the base station, wherein the grant includes the indication of the second subset of physical resource blocks.

20. The method of claim 15, further comprising:
identifying an active time interval associated with the first subset of physical resource blocks, wherein the transitioning to monitoring the second subset of physical resource blocks is based at least in part on expiration of the active time interval.

21. The method of claim 20, further comprising:
identifying a probability distribution based at least in part on expiration of the active time interval; and
selecting the second subset of physical resource blocks randomly based at least in part on the probability distribution, wherein the transitioning to monitoring the second subset of physical resource blocks is based at least in part on the selected second subset of physical resource blocks.

22. The method of claim 15, further comprising:
identifying a frequency hopping configuration wherein the transitioning to monitoring the second subset of physical resource blocks is based at least in part on the frequency hopping configuration.

23. The method of claim 22, further comprising:
receiving an indication of the frequency hopping configuration from the base station, wherein the frequency hopping configuration is identified based at least in part on the received indication.

24. A method for wireless communications at a base station, comprising:
identifying an initial transition of a user equipment (UE) from monitoring a first set of physical resource blocks to monitoring a first subset of physical resource blocks, wherein the first set of physical resource blocks is associated with less bandwidth than a channel frequency bandwidth;
communicating with the UE based at least in part on the first subset of physical resource blocks, wherein the first subset of physical resource blocks is associated with a first bandwidth and the first set of physical resource blocks is associated with a second bandwidth, and wherein the first bandwidth is less than the first bandwidth and the first bandwidth is associated with at least a reference signal bandwidth;
transmitting signaling to transition the UE from monitoring the first subset of physical resource blocks to monitoring a second subset of physical resource blocks; and
communicating with the UE based at least in part on data transmitted via the second subset of physical resource blocks.

25. The method of claim 24, further comprising:
identifying a hashing function between indices associated with one or more subsets of physical resource blocks and one or more of an international mobile subscriber identity of the UE or a radio network temporary identifier of the UE, wherein the signaling to transition the UE comprises the hashing function.

26. The method of claim 24, further comprising:
identifying a probability distribution for UE random selection between one or more subsets of physical resource blocks, wherein the signaling to transition the UE comprises the probability distribution.

27. The method of claim 24, wherein identifying the initial transition of the UE to monitoring the first subset of physical resource blocks comprises:
identifying a default initial subset of physical resource blocks, wherein the first subset of physical resource blocks comprises the identified default initial subset of physical resource blocks.

28. The method of claim 24, wherein the signaling to transition the UE comprises an indication of the second subset of physical resource blocks.

29. The method of claim 28, wherein the indication comprises one or more of an index associated with the first subset of physical resource blocks or a center frequency associated with the first subset of physical resource blocks and the first bandwidth.

30. The method of claim 28, wherein the indication is transmitted via radio resource control signaling, downlink control information, or a medium access control control element.

31. The method of claim 28, wherein the indication comprises a group index corresponding to a group of the UE.

32. The method of claim 24, wherein the signaling to transition the UE comprises a grant including an indication of the second subset of physical resource blocks.

33. The method of claim 24, wherein the signaling to transition the UE comprises a frequency hopping configuration.

34. The method of claim 24, further comprising:
performing a random access channel procedure with the UE, wherein the initial transition of the UE is identified based at least in part on the performed random access channel procedure.

35. The method of claim 24, further comprising:
transmitting one or more system information blocks, wherein the initial transition of the UE is identified based at least in part on the one or more transmitted system information blocks.

36. The method of claim 24, further comprising:
performing a random access channel procedure with the UE based at least in part on the identified initial transition of the UE.

37. The method of claim 24, further comprising:
transmitting an indication of a frequency location for each of one or more subsets of physical resource blocks in one or more of a system information block or dedicated radio resource control signaling, wherein the signaling to transition the UE from monitoring the first subset of physical resource blocks to the second subset of physical resource blocks is transmitted based at least in part on the transmitted indication.

38. The method of claim 24, wherein identifying the initial transition of the UE comprises:
identifying one or more of a probability distribution for UE random selection or a hashing function for UE selection; and
identifying the first subset of physical resource blocks based at least in part on one or more of the probability distribution or the hashing function, wherein the initial transition is identified based at least in part on the identified first subset of physical resource blocks.

39. The method of claim 24, further comprising:
transmitting an indication of the first subset of physical resource blocks, wherein the initial transition of the UE from monitoring the first set of physical resource blocks to monitoring the first subset of physical resource blocks is identified based at least in part on the transmitted indication.

40. The method of claim 39, wherein the indication comprises one or more of an index associated with the first subset of physical resource blocks or a center frequency associated with the first subset of physical resource blocks and the first bandwidth associated with the first subset of physical resource blocks.

41. An apparatus for wireless communication at a user equipment (UE), comprising:
a processor,
memory coupled with the processor; and
instructions stored in the memory and executable by the processor to cause the apparatus to:
receive a synchronization signal by monitoring a first set of physical resource blocks, wherein the first set of physical resource blocks is associated with less bandwidth than a channel frequency bandwidth;
perform cell acquisition based at least in part on the received synchronization signal;
transition from monitoring the first set of physical resource blocks to monitoring a first subset of physical resource blocks based at least in part on the cell acquisition, wherein the first subset of physical resource blocks is associated with a first bandwidth and the first set of physical resource blocks is associated with a second bandwidth, and wherein the first bandwidth is less than the second bandwidth and the first bandwidth is associated with at least a reference signal bandwidth; and
communicate with a base station based at least in part on data received via the first subset of physical resource blocks.

42. The apparatus of claim 41, wherein the instructions are further executable by the processor to cause the apparatus to:
identify one or more subsets of physical resource blocks based at least in part on the cell acquisition; and
select the first subset of physical resource blocks from the one or more subsets of physical resource blocks, wherein the transitioning to monitoring the first subset of physical resource blocks is based at least in part on the selection.

43. The apparatus of claim 41, wherein the instructions are further executable by the processor to cause the apparatus to:
receive an indication of the first subset of physical resource blocks from the base station, wherein the transitioning to monitoring the first subset of physical resource blocks is based at least in part on the received indication.

44. An apparatus for wireless communications at a base station, comprising:
a processor,
memory coupled with the processor; and
instructions stored in the memory and executable by the processor to cause the apparatus to:
identify an initial transition of a user equipment (UE) from monitoring a first set of physical resource blocks to monitoring a first subset of physical resource blocks, wherein the first set of physical resource blocks is associated with less bandwidth than a channel frequency bandwidth;
communicate with the UE based at least in part on the first subset of physical resource blocks, wherein the first subset of physical resource blocks is associated with a first bandwidth and the first set of physical resource blocks is associated with a second bandwidth, and wherein the first bandwidth is less than the second bandwidth and the first bandwidth is associated with at least a reference signal bandwidth;
transmit signaling to transition the UE from monitoring the first subset of physical resource blocks to monitoring a second subset of physical resource blocks; and
communicate with the UE based at least in part on data transmitted via the second subset of physical resource blocks.

45. The apparatus of claim 44, wherein the instructions are further executable by the processor to cause the apparatus to:
transmit an indication of the first subset of physical resource blocks, wherein the initial transition of the UE from monitoring the first set of physical resource blocks to monitoring the first subset of physical resource blocks is identified based at least in part on the transmitted indication.

* * * * *